United States Patent
Ayush et al.

(10) Patent No.: US 10,789,622 B2
(45) Date of Patent: *Sep. 29, 2020

(54) GENERATING AND PROVIDING AUGMENTED REALITY REPRESENTATIONS OF RECOMMENDED PRODUCTS BASED ON STYLE COMPATIBILITY IN RELATION TO REAL-WORLD SURROUNDINGS

(71) Applicant: Adobe Inc., San Jose, CA (US)

(72) Inventors: Kumar Ayush, Jharkhand (IN); Gaurush Hiranandani, Rajasthan (IN)

(73) Assignee: ADOBE INC., San Jose, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 15/972,815

(22) Filed: May 7, 2018

(65) Prior Publication Data
US 2019/0340649 A1  Nov. 7, 2019

(51) Int. Cl.
G06Q 30/00 (2012.01)
G06Q 30/02 (2012.01)
G06K 9/00 (2006.01)
G06T 19/00 (2011.01)

(52) U.S. Cl.
CPC ..... *G06Q 30/0261* (2013.01); *G06K 9/00671* (2013.01); *G06T 19/006* (2013.01)

(58) Field of Classification Search
None
See application file for complete search history.

(56) References Cited

U.S. PATENT DOCUMENTS

| 8,606,645 B1* | 12/2013 | Applefeld | G06T 19/006 705/14.25 |
| 9,449,342 B2 | 9/2016 | Sacco | |
| 10,529,137 B1 | 1/2020 | Black et al. | |
| 2002/0045959 A1 | 4/2002 | Van Overveld | |
| 2012/0323910 A1 | 12/2012 | Ilyas et al. | |

(Continued)

OTHER PUBLICATIONS

"Inside Houzz: Introducing View in My Room", Jan. 24, 2018, www.houzz.co.uk (Year: 2018).*

(Continued)

*Primary Examiner* — Naresh Vig
(74) *Attorney, Agent, or Firm* — Keller Jolley Preece

(57) ABSTRACT

The present disclosure relates to systems, methods, and non-transitory computer readable media for generating augmented reality representations of recommended products based on style compatibility with real-world surroundings. For example, the disclosed systems can identify a real-world object within a camera feed and can utilize a 2D-3D alignment algorithm to identify a three-dimensional model that matches the real-world object. In addition, the disclosed systems can utilize a style compatibility algorithm to generate recommended products based on style compatibility in relation to the identified three-dimensional model. The disclosed systems can further utilize a color compatibility algorithm to determine product textures which are color compatible with the real-world surroundings and generate augmented reality representations of recommended products to provide as an overlay of the real-world environment of the camera feed.

20 Claims, 14 Drawing Sheets

(56) References Cited

U.S. PATENT DOCUMENTS

| | | | | |
|---|---|---|---|---|
| 2013/0106910 | A1* | 5/2013 | Sacco | G06Q 30/0643 345/633 |
| 2014/0285522 | A1 | 9/2014 | Kim et al. | |
| 2014/0337174 | A1* | 11/2014 | Lin | G06Q 30/0269 705/26.61 |
| 2015/0178786 | A1 | 6/2015 | Claessens | |
| 2016/0019618 | A1 | 1/2016 | Lin et al. | |
| 2018/0012411 | A1 | 1/2018 | Richey et al. | |
| 2018/0260843 | A1 | 9/2018 | Hiranandani et al. | |

OTHER PUBLICATIONS

Zhang et al., E-Commerce Direct Marketing using Augmented Reality, 2000, IEEE (Year: 2000).*

Yim et al., Is Augmented Reality Technology and Effective Tool for E-commerce, Jun. 27, 2017, Journal of Interactive Marketing (Year: 2017).*

Inside Houzz: Introducing View in My Room' retrieved Jan. 24, 2018 from https://www.houzz.ie/magazine/ inside-houzz-introducing-view-in-my-room-stsetivw-vs-103238920 (Year: 2018).

U.S. Appl. No. 16/004,787, Aug. 2, 2019, Preinterview 1st Office Action.

U.S. Appl. No. 16/004,787, Sep. 20, 2019, Office Action.

"Augmented/Virtual Reality revenue forecast revised to hit $120 billion by 2020," http://www.digi-capital.com/news/2016/01/augmentedvirtual-reality-revenue-forecast-revised-to-hit-120-billion-by-2020/ dated Jan. 13, 2016.

Papagiannis, H., "Announcing: Augmented Human: How Technology is Shaping the New Reality," https://augmentedstories.com/page/2/ dated May 31, 2015.

"Augmented and Virtual Reality Devices to Become a $4 Billion-Plus Business in Three Years," http://www.ccsinsight.com/press/company-news/2251-augmented-and-virtual-reality-devices-to-become-a-4-billion-plus-business-in-three-years, retrieved Jul. 26, 2018.

"Increasing Conversions with Retargeting Emails and Website Personalization," http://www.barilliance.com/wp-content/uploads/2015/09/Increasing-conversions-with-cart-abandonment-and-website-personalization, retrieved Jul. 26, 2018.

"All the needles you want in a really, really big haystack," https://www.advertising.com/advertiser/targeting dated Jul. 26, 2018.

Weng, Sung-Shun, and Mei-Ju Liu. "Personalized product recommendation in e-commerce." e-Technology, e-Commerce and e-Service, 2004. EEE'04. 2004 IEEE International Conference on. IEEE, 2004.

Grbovic, Mihajlo, et al. "E-commerce in Your Inbox: Product Recommendations at Scale." Proceedings of the 21th ACM SIGKDD International Conference on Knowledge Discovery and Data Mining. ACM, 2015.

http://vuforia.com/ retrieved Jul. 26, 2018.

https://unity3d.com/ retrieved Jul. 26, 2018.

Shaoqing Ren, Kaiming He, Ross Girshick, Jian Sun. Faster R-CNN: Towards Real-Time Object Detection with Region Proposal Networks. Advances in Neural Information Processing Sytems (NIPS), 2015.

Girshick, Ross, et al. "Rich feature hierarchies for accurate object detection and semantic segmentation," airXiv:1311.2524v5 [cs.CV], dated Oct. 22, 2014.

M. Aubry, D. Maturana, A. Efros, B. Russell and J. Sivic. "Seeing 3D chairs: exemplar part-based 2D-3D alignment using a large dataset of CAD models". CVPR, 2014.

Tiangiang Liu, Aaron Hertzmann, Wilmot Li and Thomas Funkhouser. "Style Compatibility for 3D Furniture Models". ACM Transactions on Graphics, Aug. 2015.

Kulis, B. "Metric learning: A survey". Foundations & Trends in Machine Learning. 2012.

Naresh Boddeti, Vishnu, Takeo Kanade, and B. V. K. Vijaya Kumar. "Correlation filters for object alignment." Proceedings of the IEEE Conference on Computer Vision and Pattern Recognition. 2013.

Peter O'Donovan, Aseem Agarwala, Aaron Hertzmann. Color Compatibility From Large Datasets. ACM Transactions on Graphics, 2011, 30, 43, (Proc. SIGGRAPH).

Jones, Donald R., Cary D. Perttunen, and Bruce E. Stuckman. "Lipschitzian optimization without the Lipschitz constant." Journal of Optimization Theory and Applications 79.1 (1993): 157-181.

Q Mei, J Guo, D Radev. DivRank: the interplay of prestige and diversity in information networks. Proceedings of the 16th ACM SIGKDD international conference on Knowledge discovery and data mining, 2010.

Gupta, Saurabh, et al. "Learning rich features from RGB-D images for object detection and segmentation." European Conference on Computer Vision. Springer International Publishing, 2014.

Ye, Jun, and Kien A. Hua. "Exploiting depth camera for 3d spatial relationship interpretation." Proceedings of the 4th ACM Multimedia Systems Conference. ACM, 2013.

Rishiraj Saha Roy et al. Automated Linguistic Personalization of Targeted Marketing Messages Mining UserGenerated Text on Social Media, Apr. 2015.

Lavneet Singh , Girija Chetty. Email Personalization and User Profiling Using RANSAC Multi Model Response Regression Based Optimized Pruning Extreme Learning Machines and Gradient Boosting Trees. International Conference on Neural Information Processing Systems, 2015.

Navdeep S. Sahni, S. Christian Wheeler and Pradeep Chintagunta. Personalization in Email Marketing: The Role of Self-Relevant Non-Informative Advertising Content, Jan. 30, 2016.

Modani, Natwar et al. "Creating Diverse Product Review Summaries: A Graph Approach" International Conference on Web Information Systems Engineering, Dec. 25, 2015.

Maureen Stone, Choosing Colors for Data Visualization, Jan. 17, 2006.

Tianyi Wu, Yuguo Chen and Jiawei Han. Association Mining in Large Databases: A Reexamination of Its Measures. 11th European Conference on Principles and Practice of Knowledge Discovery in Databases (2007).

Carly Stec, 6 Tips for Making the Most of Your Retargeting Campaigns, http://blog.hubspot.com/agency/retargeting-campaigns#sm.0000p5uh3wlw6eihxsd1a5wgivk90, May 18, 2015.

TextilWirtschaft, Goertz Virtual Shoe Fitting, https://www.youtube.com/watch?v=silya3JSpEU, Jun. 1, 2012.

Julie Hopkins, Adam Sarner "Market Guide for Email Marketing", Nov. 30, 2015.

Heather Pemberton Levy "5 Key Trends in Gartner's 2015 Digital Marketing Hype Cycle" http://www.gartner.com/smarterwithgartner/five-key-trends-in-gartners-2015-digital-marketinghype-cycle/ dated Oct. 1, 2015.

Joachims, T. Optimizing Search Engines using Clickthrough Data. Proceedings of the ACM Conference on Knowledge Discovery and Data Mining, 2003.

https://pypi.python.org/pypi/Pillow/2.1.0 dated Jul. 2, 2013.

http://www.ray-ban.com/india/virtual-mirror, Ray-Ban® Official Site India retrieved Jul. 26, 2018.

Zhaoliang Lun, Evangelos Kalogerakis, Alla Sheffer. Elements of Style: Learning Perceptual Shape Style Similarity. ACM Transactions on Graphics (Proc. ACM SIGGRAPH 2015).

U.S. Appl. No. 16/004,787, Mar. 9, 2020, Office Action.

U.S. Appl. No. 15/454,750, Dec. 23, 2019, Office Action.

Kalkofen et al., "Interactive Focus and Context Visualization for Augmented Reality," 2007 6th IEEE and ACM International Symposium on Mixed and Augmented Reality, Nara, 2007, pp. 191-201, doi: 10.1109/ISMAR.2007.4538846. (Year: 2007).

U.S. Appl. No. 16/004,787, dated May 8 ,2020, Office Action.

U.S. Appl. No. 15/454,750, dated Jul. 1, 2020, Office Action.

* cited by examiner

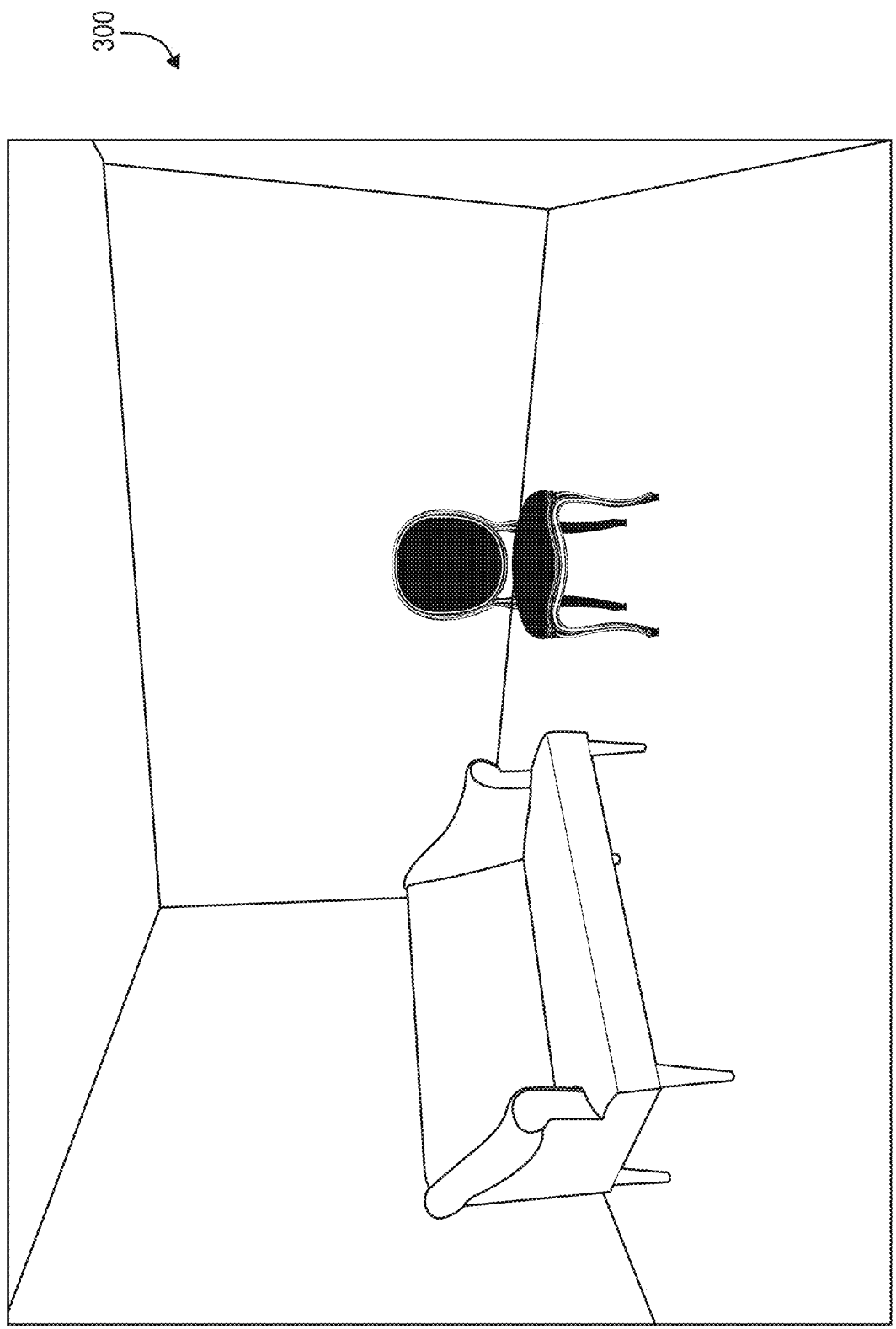

US 10,789,622 B2

GENERATING AND PROVIDING AUGMENTED REALITY REPRESENTATIONS OF RECOMMENDED PRODUCTS BASED ON STYLE COMPATIBILITY IN RELATION TO REAL-WORLD SURROUNDINGS

BACKGROUND

Digital content providers, digital publishers, and digital marketers increasingly seek techniques for creating targeted content that personalizes communications for users based on available information about the users. Such targeted content comes in various forms. For example, some digital publishers and marketers create targeted content by inserting a user's name (extracted from a user profile) into an email, pop-up advertisement, or another digital message. Other digital marketers create targeted content by, for example, adjusting content of a message based on a device's location data, such as information extracted from a web browser or an IP address connected to the user's device. Still other digital marketers contextualize content by identifying adjectives or adverbs from social media posts and inserting the identified adjectives or adverbs into advertisements.

In addition to extracting information from a device or from software running on the device, digital publishers and marketers commonly create targeted content based on a user's web-browsing data. For example, some conventional techniques of contextualized content delivery include selecting content based on a user's web-browsing history (e.g., URL addresses visited by a user) or prior e-commerce transactions (e.g., products purchased through a website or mobile application). Other conventional techniques of contextualized content delivery include generating a product recommendation based on metadata associated with the product.

While conventional techniques can enable marketers to provide relevant information, conventional techniques often have various drawbacks. For example, users are often wary of providing information on the Internet and often intentionally provide false information. As such, targeted content based on web-browsing data can be inaccurate. Furthermore, techniques that rely upon metadata commonly rely on administrators or others to properly tag or otherwise associate products with metadata, which can be time consuming, expensive, and inaccurate. Because of their reliance on human generated metadata, these conventional techniques can generate inaccurate, ineffective product recommendations that users frequently ignore. Furthermore, such techniques are inflexible and cannot adapt to scenarios where metadata is unavailable. In addition, conventional techniques often fail to target aspects of user's lives, like their physical surroundings, not apparent from their digital footprint.

SUMMARY

One or more embodiments described herein provide benefits and solve one or more of the foregoing or other problems in the art by providing systems, methods, and non-transitory computer readable media that accurately and flexibly generate augmented reality ("AR") product recommendations. The disclosed systems identify objects within an augmented reality scene to gather information concerning the user's physical environment or physical features. In particular, the disclosed systems and methods detect characteristics of objects shown within an AR scene and, based on the detected characteristics, generate targeted content for a user. For instance, the disclosed systems utilize a style compatibility algorithm to identify products whose style matches the style of a user's real-world surroundings detected from the augmented reality scene.

For example, to generate an AR product recommendation, the disclosed systems identify a real-world object depicted within a camera view of a user client device. Based on the identified real-world object, the system determines a three-dimensional model from a model database that matches the identified real-world object. Additionally, the system determines the product class of an AR product being overlaid by the user on the real-world environment shown in the camera feed. Then, based on the product class of the AR product and further based on the three-dimensional model of the identified real-world object, the disclosed systems utilize a style compatibility algorithm to generate a recommended product. The systems further generate an AR representation of the recommended product by overlaying it within the real-world environment of the camera feed.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 3A illustrates a digital image of a viewpoint from the AR scene of FIG. 2 in accordance with one or more implementations;

DETAILED DESCRIPTION

Figure 1:
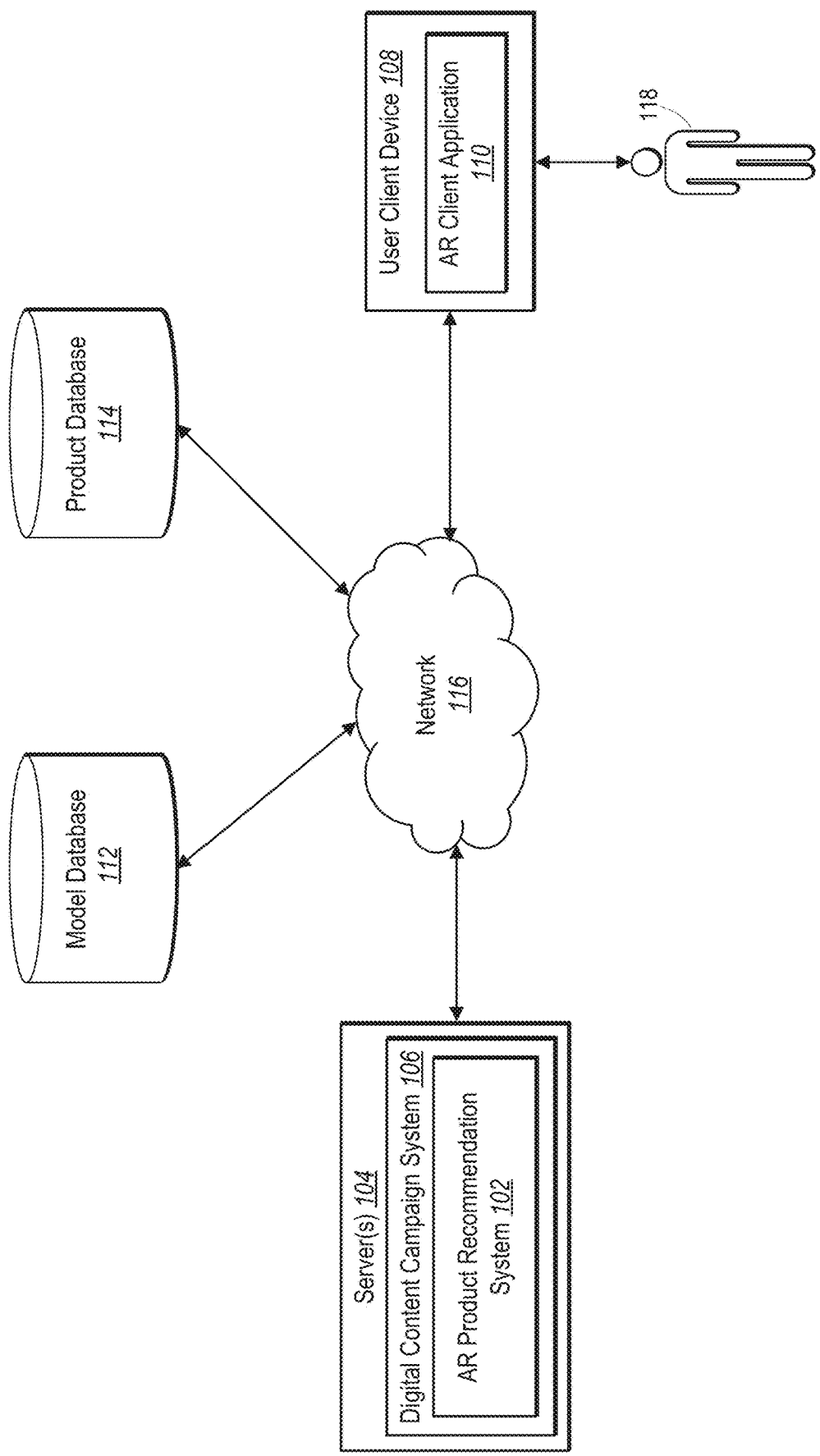
FIG. 1 illustrates an example environment for implementing an AR product recommendation system in accordance with one or more implementations.

This disclosure describes one or more embodiments of an augmented reality ("AR") product recommendation system that accurately and flexibly generates AR product recommendations that match the style of surrounding real-world objects. In particular, the disclosed AR product recommendation system detects objects shown within an AR scene (received from a user's client device) and, based on the detected objects, selects products with matching styles to recommend to the user. For example, to generate an AR product recommendation, the AR product recommendation system identifies a real-world object depicted within a camera view of a user client device. Based on the identified real-world object, the AR product recommendation system determines a three-dimensional model from a model database that matches the identified real-world object. Additionally, the AR product recommendation system determines the product class of an AR product being overlaid by the user on the real-world environment shown in the camera feed. Then, based on the product class of the AR product and further based on the three-dimensional model of the identified real-world object, the AR product recommendation system utilizes a style compatibility algorithm to generate a recommended product. The AR product recommendation system further generates an AR representation of the recommended product by overlaying it within the real-world environment of the camera feed.

As overview, the AR product recommendation system works in connection with an AR client application. The AR client application enables a user to insert virtual objects into a real scene of the user's choosing to create an AR scene. Thus, the AR client application allows a user to see how a product would appear in a real-world scene without having to have the actual product. Typically, a user is left to their own devices to select a virtual product to insert into the real scene. One will appreciate that when there are many different potential virtual objects, this process can be tedious and time consuming. As explained below, the AR product recommendation system uses computer vision techniques and artificial intelligence to generate recommended products that match a style of one or more real world objects in the real scene.

As mentioned the AR client application allows a user to select various products to see within a real-world environment. More particularly, the AR product recommendation system can render a selected object to appear within the real-world environment to give the user a realistic sense of what the selected product would look like in a setting. Indeed, as part of an AR client application session, the AR product recommendation system can render a three-dimensional AR product to appear to a user as though the represented product is placed at a particular location within the real-world environment shown via the camera feed. Accordingly, during the application session, the AR product recommendation system can generate an AR screenshot by capturing a frame of the camera feed that includes the overlay of the AR product and the real-world environment.

The AR product recommendation system can use the user-selected AR product and the location where the user placed the AR product as input for selecting one or more recommended products. In particular, the AR product recommendation system can generate or identify a recommended product of the same type or class as the user-selected AR product that matches a style of real-world objects in the real-world environment in which the user placed the AR product. Furthermore, the AR product recommendation system can place the recommended product in the same position within a view of the real-world environment as the user placed the AR product.

The AR product recommendation system can analyze the AR screenshot to determine a location and an orientation of the AR product depicted within the AR screenshot. To illustrate, the AR product recommendation system can analyze the AR screenshot to store a coordinate location in world-space of where a user places the AR product. The AR product recommendation system can further utilize correlation filters to determine a pose or orientation of the AR product with respect to camera coordinates. Additional detail regarding determining the location and orientation of the AR product is provided below with reference to the figures. The AR product recommendation system can use the determined location and orientation to place a recommended product.

Furthermore, to generate an AR representation of a product to recommend to a user, the AR product recommendation system can analyze a camera feed of a user client device to determine a viewpoint associated with the camera feed. In particular, the AR product recommendation system can capture a frame of the camera feed while a user is operating the AR client application. The viewpoint is then used to identify one or more real world objects in the real-world environment captured by the camera feed.

For instance, the AR product recommendation system can analyze the viewpoint and generate proposed regions of the viewpoint with corresponding probabilities of containing objects. Indeed, the AR product recommendation system can generate bounding boxes around the proposed regions of the viewpoint. The AR product recommendation system then generates a confidence score (e.g., a probability) and an object label for each bounding box that indicates a likelihood of the bounding box containing a real-world object that corresponds to the given object label.

Based on identifying a real-world object within the viewpoint, the AR product recommendation system can further identify a three-dimensional model that matches the identified real-world object. The AR product recommendation system uses the identified three-dimensional model as a basis for determining a style of real-world object within the viewpoint. To elaborate, the AR product recommendation system can implement a 2D-3D alignment algorithm to identify, from a model database, a three-dimensional model that matches (e.g., is within a similarity threshold of) the identified real-world object. Additional detail regarding utilizing the 2D-3D alignment algorithm to identify a three-dimensional model that matches a real-world object depicted within a viewpoint is provided below with reference to the figures.

In addition to identifying a three-dimensional model that matches an object shown in the viewpoint, the AR product recommendation system can further generate one or more recommended products based on style compatibility with the three-dimensional model of the identified real-world object shown in the viewpoint. To illustrate, the AR product recommendation system can utilize a style compatibility algorithm to identify products from within a product database that share similar geometric features to the identified three-dimensional model and that further match a product class associated with the user-selected AR product. Indeed, the AR product recommendation system generates product recommendations by identifying products with similar stylistic appearance to the identified three-dimensional model (e.g., the three-dimensional model that matches the real-world object identified within the viewpoint) and with a product class that matches (or is similar to) the product class of the AR product overlaid within the AR screenshot. Additional detail regarding generating product recommendations by utilizing a style compatibility algorithm is provided below with reference to the figures.

Upon generating recommended products, the AR product recommendation system can further generate AR representations of the recommended products to provide for display to the user. In particular, the AR product recommendation system can utilize a color compatibility algorithm to generate an AR representation of a recommended product that matches a color theme present in the viewpoint. The AR product recommendation system can embed the AR representation of the recommended product within the real-world environment of the camera feed at the previously determined location and orientation. In this manner, the AR representation includes a recommended product that matches not only the style of the real-world environment but is also color compatible with the real-world environment. Accordingly, the AR product recommendation system can provide one or more AR representations of recommended products as an overlay within the real-world environment of the camera feed. In some embodiments, the AR product recommendation system provides AR representations of more than one recommended product so that the user can compare the recommended products. Additional detail regarding generating the AR representations is provided below with reference to the figures.

The AR product recommendation system provides several advantages over conventional product recommendation systems. For example, the AR product recommendation system improves the accuracy and effectiveness of product recommendations over conventional systems. For instance, because the AR product recommendation system utilizes a style compatibility algorithm to identify products that are similar in style to real-world surrounding objects associated with a user client device, the AR product recommendation system more accurately generates recommended products that match a particular scene captured by a camera feed. Thus, for similar reasons, the AR product recommendation system provides product recommendations that more accurately reflect a user's taste or preference. Furthermore, the AR product recommendation system generates more effective product recommendations because not only do the recommended products more closely match a style of a real-world environment, but users can also gain a better sense what a particular product would look like within the real-world environment by viewing the AR representation of the product. The AR product recommendation system thus more thoroughly informs users about products, enabling users to make smarter purchasing decisions.

The AR product recommendation system also improves flexibility over conventional systems. To illustrate, conventional product recommendation systems analyze metadata to identify similar products by, for example, identifying products that have matching tags, thus relying on accurate metadata to match products and ignoring products that may have similar visual appearances, but which are poorly or improperly tagged. The AR product recommendation system, by contrast, analyzes objects identified within a camera feed based on their visual appearance and further identifies products that match a style identified via the object analysis. Thus, the AR product recommendation system can flexibly adapt to any real-world environment associated with a user client device to generate recommended products based on the visual context of the user client device as captured by the camera feed.

By analyzing visual information of an AR scene and determining the style of objects within that scene, the disclosed AR product recommendation system does what many conventional techniques of contextualized content delivery cannot-detects a user's physical environment or physical features. In some embodiments, for example, the AR product recommendation system analyzes the determined styles and various potential endorsed products to provide product recommendations with customization that is unmatched by conventional techniques.

As illustrated by the foregoing discussion, the present disclosure utilizes a variety of terms to describe features and benefits of the AR product recommendation system. Additional detail is hereafter provided regarding the meaning of these terms as used in this disclosure. For example, as used herein, the term "product" refers to an object or item that the AR product recommendation system can recommend for purchase or use. Products can be classified into product classes. As used herein, the term "product class" refers to a type or group of products that share attributes or characteristics. Example product classes include, but are not limited to, chairs, tables, couches, shirts, pants, shoes, hats, etc.

As mentioned, the AR product recommendation system analyzes a camera feed received from a user client device to determine a viewpoint that depicts a real-world environment associated with the user client device. As used herein, the term "user client device" refers to a computing device associated with a user. For example, a user client device can refer to a mobile device such as a smartphone or tablet or can refer to a non-mobile device such as a desktop or laptop computer. A user client device can also refer to an AR device capable of rendering AR content on a view of a real-world environment. For example, a user client device can refer to MICROSOFT HOLOLENS or MAGIC LEAP LIGHTWEAR.

As also used herein, the term "camera feed" refers to a view or scene captured by a camera associated with a user client device. In particular, a camera feed can refer to a view of a real-world environment captured by the camera of the user client device and that is viewable by a user via a display associated with the user client device. For example, a camera feed can refer to a view of a room, a field, a person, a group of people, or some other scene captured by a camera.

As mentioned, the AR product recommendation system determines a viewpoint from the camera feed. As used herein, the term "viewpoint" refers to a view of a camera at a particular time instant. In particular, a viewpoint can refer to a frame captured from the camera feed at a given time instant. In addition to determining a viewpoint, the AR product recommendation system can determine an augmented reality screenshot associated with a camera feed. As used herein, the term "augmented reality screenshot" or "AR screenshot" refers to a frame of an application session at a particular time instant and that includes a view of the real-world environment along with a view of an AR product. Thus, a viewpoint includes a view of the real-world environment, and an AR screenshot includes a view of the real-world environment together with an overlaid AR product.

As used herein, the term "augmented reality product" or "AR product" refers to an AR representation of a product. Indeed, as mentioned, the AR product recommendation system can generate an AR product to overlay on a view of a real-world environment to appear as though the AR product is within the real-world environment. For example, the AR product recommendation system can generate the AR product to be world-fixed (i.e., fixed in world-space) in relation to the real-world environment so that, as a user moves a user client device, the AR product appears to stay in place within the real-world environment. In addition, the AR product recommendation system can enable a user to interact with an AR product to move, rotate, and/or scale the AR product within the real-world environment of the camera feed. Indeed, as will be described in further detail below, the AR product recommendation system can determine a location and an orientation (e.g., pose) of an AR product.

As mentioned, the AR product recommendation system analyzes the viewpoint to identify a real-world object. As used herein, the term "real-world object" (or sometimes simply "object") refers to an object other than a product that is depicted within the camera feed. In particular, a real-world object can refer a physical object that exists in the physical world. For example, a real-world object may include, but is not limited to, accessories, animals, clothing, cosmetics, footwear, fixtures, furnishings, furniture, hair, people, physical human features, vehicles, or any other physical object that exists outside of a computer. In some embodiments, a digital image depicts real objects within an AR scene. The AR product recommendation system can identify and analyze a real-world object to identify a style of the real-world object to which the AR product recommendation system can match recommended products.

Indeed, based on an identified real-world object, the AR product recommendation system can access a model database to identify a three-dimensional model that matches the identified object. As used herein, the term "three-dimensional model" refers to a model stored in a digital repository (e.g., the model database) that the AR product recommendation system can match to a real-world object identified within the viewpoint. The AR product recommendation system can also utilize a three-dimensional model as a basis for identifying products that are similar in appearance. As will be described in further detail below, to match a three-dimensional model with a real-world object, the AR product recommendation system can utilize a 2D-3D alignment algorithm.

As mentioned, the AR product recommendation system further generates recommended products by implementing a style compatibility algorithm. As used herein, the term "style compatibility algorithm" refers to a method or process which the AR product recommendation system utilizes to rank a plurality of products stored within a product database based on relevance to a user. For example, a style compatibility algorithm can refer to one or more machine learning models that the AR product recommendation system trains and/or utilizes to generate compatibility scores for products in relation to a particular three-dimensional model based on comparing geometric features.

In addition to generating a product recommendation based on style compatibility, the AR product recommendation system can further generate an AR representation of a recommended product. In particular, the AR product recommendation system can utilize a "color compatibility algorithm" to determine a color theme associated with the viewpoint and to further modify an AR representation of a recommended product to match the color theme. Indeed, the AR product recommendation system can adjust the color of an AR representation to more accurately match the setting of the real-world environment. Thus, the AR product recommendation system can generate AR representations of recommended products that match a style and color of a real-world environment.

As mentioned, in some embodiments the AR product recommendation system trains one or more machine learning models (e.g., neural networks) based on training data. As used herein, the term "train" refers to utilizing information to tune or teach a machine learning model. The term "training" (used as an adjective or descriptor, such as "training object") refers to information or data utilized to tune or teach the machine learning model.

More detail regarding the AR product recommendation system will now be provided with reference to the figures. For example, FIG. 1 illustrates a schematic diagram of an example environment for implementing a AR product recommendation system 102 in accordance with one or more embodiments. An overview of the AR product recommendation system 102 is described in relation to FIG. 1. Thereafter, a more detailed description of the components and processes of the AR product recommendation system 102 is provided in relation to the subsequent figures.

As shown in FIG. 1, the environment includes server(s) 104, a user client device 108, a model database 112, a product database 114, and a network 116. Each of the components of the environment can communicate via the network 116. The network 116 may be any suitable network over which computing devices can communicate. Example networks are discussed in more detail below in relation to FIG. 12.

As shown in FIG. 1, the environment includes a user client device 108 associated with a user 118. The user client device 108 can be one of a variety of computing devices, including a smartphone, desktop computer, laptop computer, AR device, or other computing device as described in relation to FIG. 12. Although FIG. 1 illustrates a single user client device 108, in some embodiments the environment can include multiple different user client devices, each associated with a different user.

As illustrated in FIG. 1, the environment includes the server(s) 104. The server(s) 104 may generate, store, receive, and transmit electronic data, such as AR content, digital video, digital images, metadata, etc. For example, the server(s) 104 may receive data from the user client device 108 in the form of a camera feed. In addition, the server(s) 104 can transmit data to the user client device 108 to provide an AR representation of a recommended product within a user's view of the camera feed. For example, the server(s) 104 can communicate with the user client device 108 to transmit and/or receive data via the network 116. In some embodiments, the server(s) 104 comprises a content server. The server(s) 104 can also comprise an application server, a communication server, a web-hosting server, a social networking server, or a digital content campaign server.

As shown in FIG. 1, the server(s) 104 also include the AR product recommendation system 102, which can form part of a digital content campaign system 106. The digital content campaign system 106 can communicate with the user client device 108 to provide digital content such as product information (e.g., recommendations) that corresponds to a style identified within a camera feed captured by the user client device 108.

Although FIG. 1 depicts the AR product recommendation system 102 located on the server(s) 104, in some embodiments, the AR product recommendation system 102 may be implemented by (e.g., located entirely or in part) on one or more other components of the environment. For example, the AR product recommendation system 102 may be implemented, in whole or in part, by the user client device 108.

Moreover, in one or more embodiments, the AR product recommendation system 102 is implemented on a third-party server. For example, in such embodiments, the server(s) 104 may be associated with a digital content publisher and a third-party server can host the AR product recommendation system 102. Specifically, the third-party server can receive information regarding a user, provide identification information for the user from the third-party server to the digital content publisher by way of the server(s) 104, and the server(s) 104 can select and provide digital content for display to a client device (e.g., the user client device 108) of the user 118.

As mentioned, the AR product recommendation system 102 may provide AR representations of recommended products to the user client device 108. Indeed, the AR product recommendation system 102 can distribute (e.g., via the network 116) product recommendations to the user client device 108, including AR representations of the recommended products.

As illustrated in FIG. 1, the user client device 108 includes an AR client application 110. The AR client application 110 may be a web application or a native application installed on the user client device 108 (e.g., a mobile application, a desktop application). The AR client application 110 can interface with the AR product recommendation system 102 to provide camera feed content and/or AR content to the server(s) 104, and to present (e.g., display) AR content received from the server(s) 104. Indeed, the AR client application 110 can receive data from the AR product recommendation system 102 and present, for display, a user interface as part of a webpage, a social networking feed, or an application interface that includes an AR representation of a recommended product.

As further illustrated in FIG. 1, the environment includes a model database 112 and a product database 114. In particular, the AR product recommendation system 102 and/or the user client device 108 can communicate with the model database 112 and/or the product database 114 via the network 116. For example, the AR product recommendation system 102 can access the model database 112 to identify a three-dimensional model that matches a real-world object identified within a camera feed of the user client device 108. In addition, the AR product recommendation system 102 can access the product database 114 to identify products that are compatible in style with a particular three-dimensional model of the identified real-world object. Although FIG. 1 illustrates the model database 112 as distinct from the product database 114, in some embodiments the model database 112 and the product database 114 can be a single database or else can be housed within a single location.

In some embodiments, though not illustrated in FIG. 1, the environment may have a different arrangement of components and/or may have a different number or set of components altogether. For example, the user client device 108 may communicate directly with the AR product recommendation system 102, bypassing the network 116. Additionally, the product database 114 may be housed within the user client device 108 and/or the server(s) 104, along with the model database 112. Further, the AR product recommendation system 102 can include one or more machine learning models (e.g., neural networks), and the AR product recommendation system 102 be implemented in a variety of different ways across the server(s) 104, the network 116, and the user client device 108.

Figure 2:
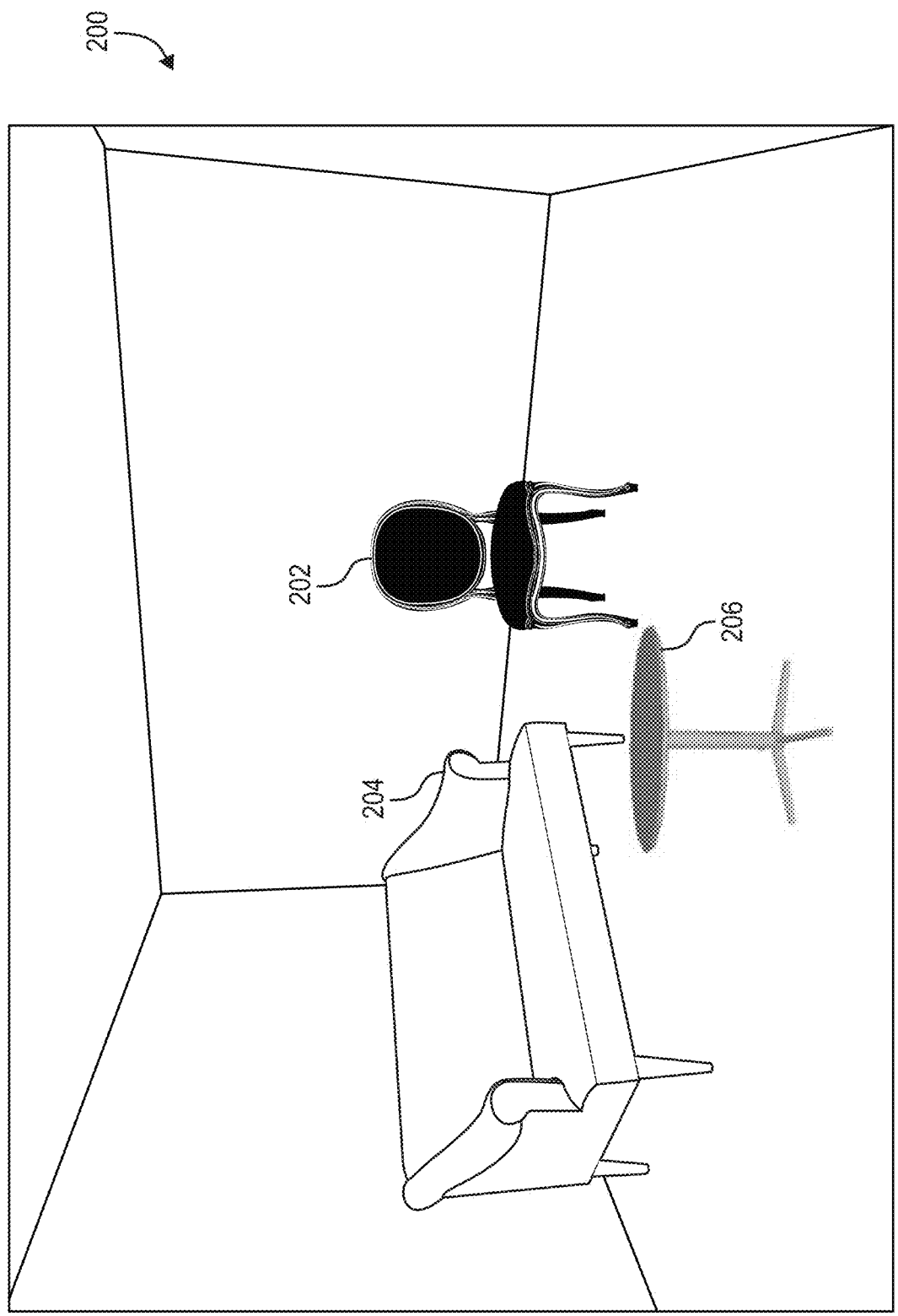
FIG. 2 illustrates an illustration of an AR scene including a recommended AR product that matches the style of a real-world product in the AR scene in accordance with one or more implementations.

As mentioned, the AR product recommendation system 102 generates an AR representation of a recommended product based on analyzing a camera feed of a user client device (e.g., the user client device 108). Indeed, FIG. 2 illustrates an AR environment 200 that includes real-world objects 202 and 204 and that further includes an AR object 206. Indeed, the discussion of FIG. 2 provides an overview of how the AR product recommendation system 102 generates the AR object 206—i.e., an AR representation of a recommended product-based on analyzing a camera feed depicting a real-world environment. Thereafter, a more detailed description of the various methods and processes implemented by the AR product recommendation system 102 to provide AR representations of recommended products is provided in relation to the subsequent figures.

As illustrated in FIG. 2, the AR product recommendation system 102 generates the AR environment 200 to provide to the user client device 108 for display to the user 118. To generate the AR environment 200, the AR product recommendation system 102 receives a camera feed from the user client device 108. In particular, the AR product recommendation system 102 receives a camera feed that depicts a scene of a real-world environment that includes the real-world object 202 and the real-world object 204. In addition, or alternatively, the AR product recommendation system 102 receives an AR application session video that depicts the real-world environment of the camera feed in addition to an AR product overlaid within the real-world environment. As an example, the AR product recommendation system 102 can communicate with the AR client application 110 with which the user 118 interacts to select an AR product to see within the real-world environment.

Based on receiving the camera feed and/or the AR application session video, the AR product recommendation system 102 generates a viewpoint and an AR screenshot. In particular, the AR product recommendation system 102 generates a viewpoint that corresponds to the camera feed. In particular, the AR product recommendation system 102 can generate a viewpoint by capturing a frame of the camera feed at a particular time instant where the user client device 108 satisfies a stillness threshold. Indeed, the AR product recommendation system 102 can access accelerometer—and/or gyroscope or inertial measurement unit ("IMU")—information to determine movement of the user client device 108. Therefore, the AR product recommendation system 102 can determine a point in time when the user client device 108 is still enough to capture a clear frame for the viewpoint.

In addition, the AR product recommendation system 102 can capture an AR screenshot based on an application session of the AR client application 110. To illustrate, the AR product recommendation system 102 can capture a frame of the AR application session that includes a view of the real-world environment together with an overlay of an AR product selected by the user 118. In some embodiments, the AR product recommendation system 102 generates the AR screenshot at the same time as the viewpoint. That is to say, the AR product recommendation system 102 utilizes the same captured frame of the camera feed for the AR screenshot as for the viewpoint, but AR product recommendation system 102 further includes the AR product within the AR screenshot and not for the viewpoint.

As mentioned, the AR product recommendation system 102 analyzes the viewpoint to identify real-world objects 202 and 204. In particular, the AR product recommendation system 102 utilizes an R-CNN to generate object proposals in the form of regions within the viewpoint that satisfy a probability threshold of containing a real-world object. Indeed, the AR product recommendation system 102 can implement a region proposal network ("RPN") to generate probabilities for various regions within the viewpoint of containing real-world objects, and the AR product recommendation system 102 can select one or more regions with probabilities above a threshold as regions likely containing objects.

Based on identifying real-world objects 202 and 204 in this way, the AR product recommendation system 102 utilizes a 2D-3D alignment algorithm to search a model database for a three-dimensional model that matches an identified real-world object. To illustrate by way of an example, the AR product recommendation system 102 identifies the real-world object 202 and searches a model database to identify a three-dimensional model that matches the two-dimensional representation of the real-world object 202 captured within the viewpoint. Indeed, the AR product recommendation system 102 searches the database to identify a chair that is similar in appearance to the chair that is the real-world object 202.

To generate the AR object 206 (i.e., the table), the AR product recommendation system 102 further utilizes a style compatibility algorithm to search a product database for products that are similar in style to the three-dimensional model identified to match the real-world object 202. In particular, the AR product recommendation system 102 implements the style compatibility algorithm to analyze geometric features of the three-dimensional model of the chair and to compare the geometric features of the chair with geometric features of a plurality of products stored within a product database. Accordingly, the AR product recommendation system 102 identifies one or more products that satisfy a similarity threshold in relation to the three-dimensional model.

Additionally, the AR product recommendation system 102 searches the product database for products that match a product class associated with the AR product identified within the AR screenshot. Indeed, to provide recommended products that would interest the user 118, the AR product recommendation system 102 can determine a product class of an AR product selected by the user 118 while interacting with the AR client application 110. Thus, the AR product recommendation system 102 not only identifies products that match a style of an identified three-dimensional model—and therefore also match a style of a corresponding real-world object 202—but the AR product recommendation system 102 further identifies products of the correct type or product class.

Accordingly, the AR product recommendation system 102 identifies a particular product—the table shown in FIG. 2—that matches both the product class desired by the user 118 and the style of the real-world environment of the camera feed. Additionally, to generate the AR object 206 to better fit within the AR environment 200, the AR product recommendation system 102 further implements a color compatibility algorithm to identify and match colors or color themes for the AR object 206. Thus, the AR product recommendation system 102 generates the AR object 206 as an AR representation of the recommended product and finds the color of the AR object 206 that is the most color compatible in accordance with colors identified within the real-world environment of the camera feed. As a result, the AR product recommendation system 102 generates and provides a recommended product, including an AR representation of the recommended product, to the user client device 108 so that the user 118 can see what the product would look like within the user's real-world surroundings.

Although FIG. 2 and subsequent figures illustrate a room with furniture where the AR product recommendation system 102 generates an AR table to recommend to a user, in some embodiments the AR product recommendation system 102 generates recommended products apart from furniture. Indeed, the AR product recommendation system 102 can analyze a camera feed that depicts any real-world environment such as an outdoor scene, a person wearing a particular style of clothing, or some other scene. Accordingly, the AR product recommendation system 102 can generate recommended products (and AR representations of those products) based on the real-world environment of the camera feed—e.g., to recommend products such as clothing items that are similar to the style of clothing worn by a group of people, accessories that match an outfit worn by an individual, landscaping items that match outdoor scenery of a house, etc.

As mentioned, the AR product recommendation system 102 determines a viewpoint based on receiving a camera feed from the user client device 108. Indeed, FIG. 3A illustrates the determined viewpoint 300. As shown, the viewpoint 300 includes a view of a real-world environment including a room with two pieces of furniture: a sofa and a chair. To determine the viewpoint 300, the AR product recommendation system 102 accesses motion-related information for a user client device (e.g., the user client device 108). For example, the AR product recommendation system 102 access an IMU, accelerometer, and/or gyroscope of the user client device 108 to determine movement of the user client device 108. Accordingly, the AR product recommendation system 102 can determine when the user client device 108 is moving quickly or moving slowly. Thus, the AR product recommendation system 102 can capture a frame of a camera feed received from the user client device 108 at a time instant when the user client device 108 satisfies a stillness threshold. To satisfy a stillness threshold, the AR product recommendation system 102 can determine that the user client device 108 is moving at a slow enough rate that the image of the camera feed is clear and stable.

In addition, or alternatively, the AR product recommendation system 102 can determine a viewpoint by capturing a frame of a camera feed at a time instant during a user's application session (e.g., while the user 118 is using the AR client application 110) when the user spends more time than a time threshold without moving the user client device 108 (or without moving it more than a tolerance). The AR product recommendation system 102 can further determine a viewpoint (e.g., the viewpoint 300) based on user interactions with an AR product that the user 118 has selected to overlay on the view of the real-world environment of the camera feed within the AR client application 110. To illustrate, in addition (or alternatively) to determining a time instant where the user client device 108 is sufficiently still, the AR product recommendation system 102 can also capture a frame of the camera feed at a time instant when the user 118 has refrained from adjusting a location and/or orientation of an AR product within the AR client application 110 for at least a threshold time period.

In some embodiments, the AR product recommendation system 102 can determine a viewpoint based on user input. For example, the AR product recommendation system 102 can receive a user interaction with an element of the AR client application 110 (e.g. a camera capture button) to capture a frame to use as a viewpoint to analyze for generating recommended products. Thus, in these embodiments the AR product recommendation system 102 can determine a viewpoint when the user 118 aims the user client device 108 at a particular scene and elects to capture a frame of a real-world environment where the user 118 would like to see and interact with AR product overlays. In still other embodiments, the AR product recommendation system 102 can implement a probabilistic model (e.g., a machine learning model) to select a viewpoint from a camera feed based on training the model to identify a camera frame with a high probability of depicting a desirable view of a real-world environment.

Figure 3B:
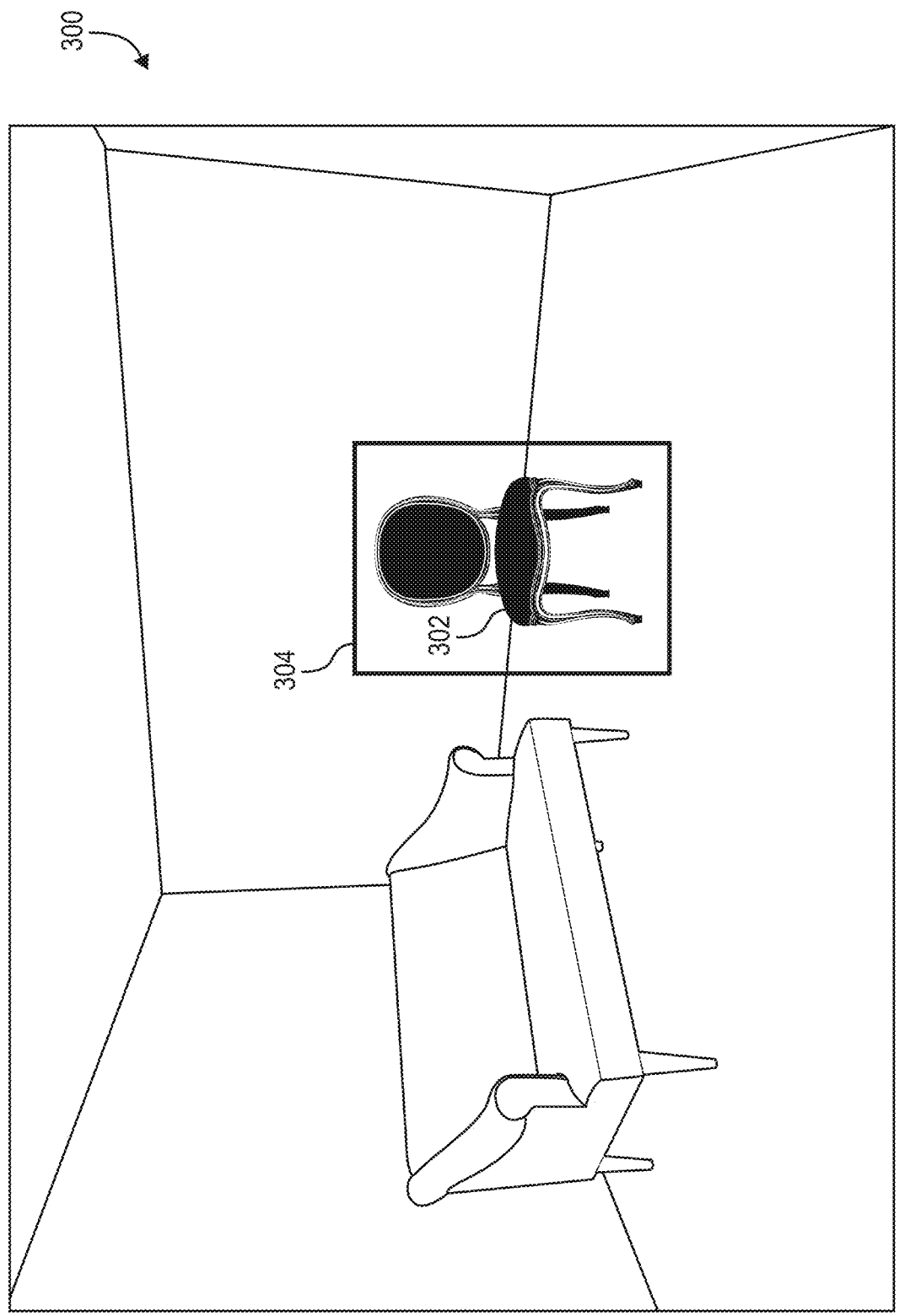
FIG. 3B illustrates an identification of a real-world product from the viewpoint of FIG. 3A in accordance with one or more implementations

As mentioned, the AR product recommendation system 102 further analyzes the viewpoint 300 to identify real-world objects within the viewpoint 300. In particular, FIG. 3B illustrates identifying a real-world object 302 within the viewpoint 300. To illustrate, the AR product recommendation system 102 analyzes the viewpoint 300 and utilizes an object detection network such as a R-CNN to detect objects within the viewpoint. To elaborate, the AR product recommendation system 102 takes the viewpoint 300 as an input image for the R-CNN and generates object proposals (such as bounding box 304) with corresponding confidence scores and object labels.

To generate proposal regions of the viewpoint 300, the AR product recommendation system 102 implements a region proposal algorithm as part of the object detection network to hypothesize object locations within the viewpoint 300. In particular, the AR product recommendation system utilizes a region proposal network that shares full-image convolutional features with the object detection network (e.g., the R-CNN), thus enabling nearly cost-free region proposals. Indeed, by utilizing a region proposal network that shares features with the object detection network, the AR product recommendation system 102 improves computational efficiency over some conventional systems that require larger amounts of computer storage and processing power to manage networks that do not share such interoperability due to their independent generation of feature vectors.

In some embodiments, the AR product recommendation system 102 merges the region proposal network with a Fast R-CNN into a single unified network (e.g., by sharing convolutional features). Thus, by using attention mechanisms, the region proposal network can inform the unified network where to look within the viewpoint 300 to detect objects.

In these or other embodiments, to generate the bounding box 304, the AR product recommendation system 102 utilizes a fully-convolutional region proposal network that simultaneously predicts object bounds and object quality region proposals. The AR product recommendation system 102 further utilizes the predicted object bounds and object quality region proposals as input for a Fast R-CNN to detect the object 302 within the viewpoint 300.

For example, the AR product recommendation system 102 can generate the bounding box 304 represented by two coordinate pairs, one for the top-left corner (x1, y1) and another for the bottom-right corner (x2, y2). Thus, for each bounding box corresponding to a different object identified within the viewpoint 300, the AR product recommendation system 102 can represent the set of all bounding boxes as:

$B=\{b_1,b_2,\ldots,b_n\}$ where B is the set of all bounding boxes, n is the total number of bounding boxes in the set, and each bounding box $b_i$ has a corresponding object label $l_i$ and confidence score $c_i$.

An object label describes the type of object identified within the viewpoint (e.g., chair, sofa, handbag, skirt, etc.), and a confidence score describes a probability that a corresponding bounding box contains a real-world object with the given object label.

As mentioned, the AR product recommendation system 102 utilizes a region proposal network together with a Fast R-CNN. To elaborate on the Fast R-CNN, the AR product recommendation system 102 utilizes a Fast R-CNN that consists of three separate models. The first generates category-independent region proposals of the viewpoint 300. The second is a large CNN that extracts a fixed-length feature vector from each proposed region. The third model is a set of class-specific linear support vector machines ("SVM"s). To implement the Fast R-CNN, the AR product recommendation system 102 can utilize the networks and techniques described in Ross Girshick, Jeff Donahue, Trevor Darrell, Jitendra Malik, *Rich Feature Hierarchies for Accurate Object Detection and Semantic Segmentation*, UC Berkeley (2014), which is incorporated herein by reference in its entirety.

To elaborate on how the AR product recommendation system 102 detects the object 302, the AR product recommendation system utilizes a Fast R-CNN to generate a convolutional feature map of the viewpoint 300. On top of the convolutional features of the feature map, the AR product recommendation system 102 utilizes the region proposal network which consists of two additional convolutional layers: one that encodes each convolutional map position into a short feature vector, and another one that, at each convolutional map position, outputs an objectness score and regressed bounds for k region proposals relative to various scales and aspect ratios for the given location.

To generate region proposals using a region proposal network, the AR product recommendation system 102 slides a small network over the convolutional feature map output by the previous shared convolutional layer. The small network is fully connected to an n×n spatial window of the input convolutional feature map. The AR product recommendation system 102 maps each sliding window to a lower-dimensional vector and feeds the lower-dimensional vector into two sibling fully-connected layers—a box regression layer and a box classification layer.

At each sliding window location, the AR product recommendation system 102 simultaneously predicts k region proposals and parameterizes the k proposals relative to k reference boxes. The AR product recommendation system 102 centers each reference box at a respective sliding window and associates the reference box with a corresponding scale and aspect ratio. In this way, the AR product recommendation system 102 takes the viewpoint 300 and outputs bounding boxes such as bounding box 304 which indicate locations of real-world objects such as real-world object 302.

In the same or other embodiments, the AR product recommendation system 102 trains the R-CNN and the region proposal network to share convolutional features by implementing an alternating optimization technique. Indeed, the AR product recommendation system 102 can train the R-CNN and the region proposal network by implementing a training scheme that alternates between fine-tuning for the region proposal task and then fine-tuning for object detection, while keeping the proposals fixed. By utilizing this scheme, the AR product recommendation system 102 converges quickly and produces a unified network with convolutional features that are shared between both tasks.

In addition, the AR product recommendation system 102 can apply a loss function as part of the training process to reduce a measure of loss or error for the region proposal network. Thus, by reducing the loss, the AR product recommendation system 102 tunes the region proposal network to more accurately identify regions of the viewpoint 300 likely to contain objects. For example, the AR product recommendation system 102 can implement the loss function described in Shaoqing Rne, Kaiming He, Ross Girshick, Jian Sun, *Faster R-CNN. Towards Real-Time Object Detection with Region Proposal Networks*, Advances in Neural Information Processing Systems (NIPS) (2015), which is incorporated herein by reference in its entirety.

Figure 4:
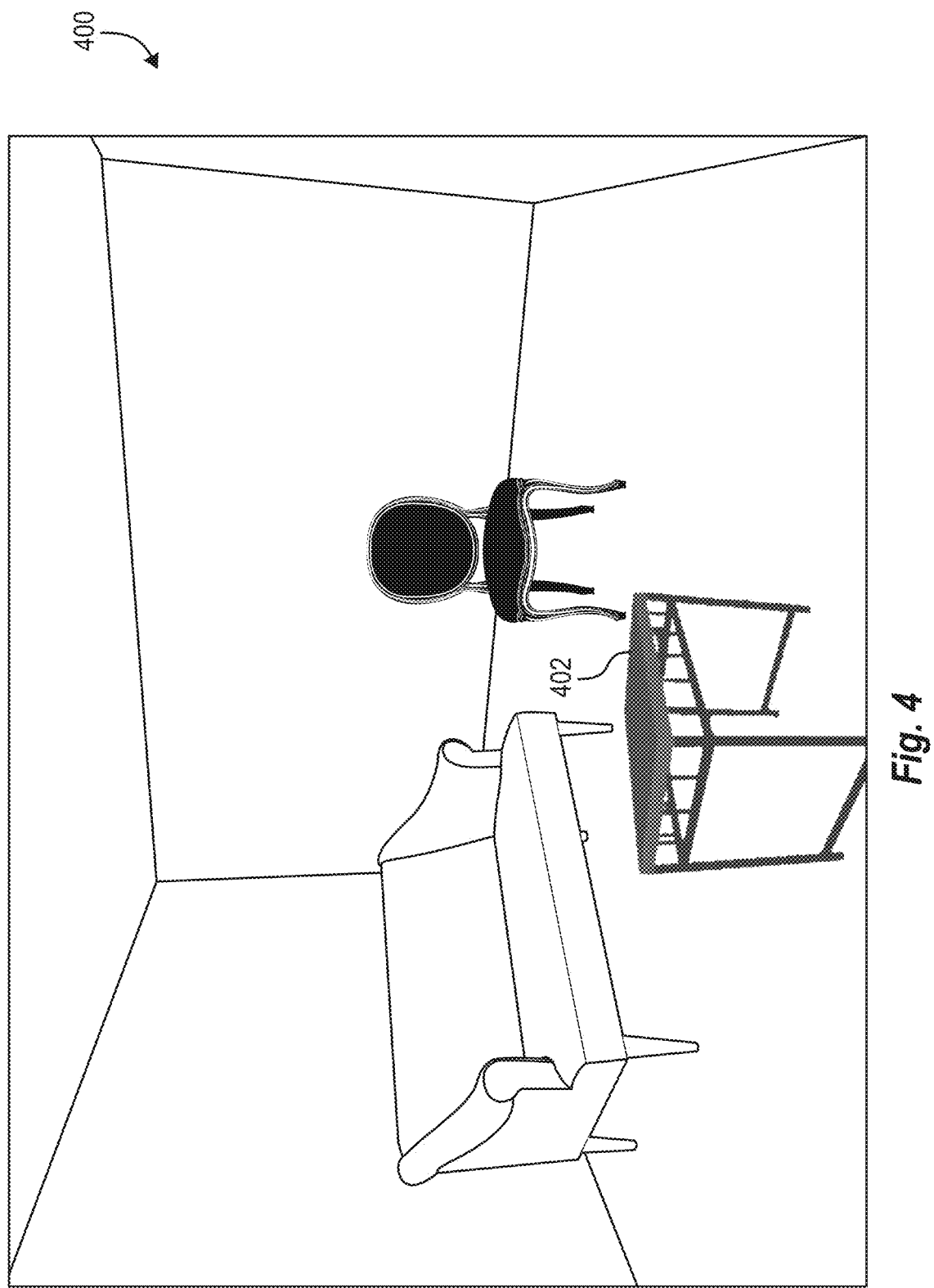
FIG. 4 illustrates an AR scene including a user-selected AR product for determining an AR screenshot in accordance with one or more implementations.

As mentioned, the AR product recommendation system 102 further captures an AR screenshot based on a session of the AR client application 110. To illustrate, FIG. 4 shows an AR screenshot 400 including an AR product 402 placed to appear within the real-world environment captured by the camera of the user client device 108. As mentioned above, to capture the AR screenshot 400, the AR product recommendation system 102 can capture a frame of the application session that includes the real-world environment of the camera feed and the AR product 402 at a time instant when the user client device 108 satisfies a stillness threshold and/or when the user 118 has not interacted with the AR product 402 (e.g., to change its location or orientation) long enough to satisfy a time threshold.

Based on the AR screenshot 400, the AR product recommendation system 102 determines a location and orientation of the AR product 402. To elaborate, the AR product recommendation system 102 utilizes correlation filters in the AR screenshot 400 to determine an orientation or pose of the AR product 402. For instance, the AR product recommendation system 102 can implement a spatial-frequency array that is specifically designed from a set of training patterns that are representative of a particular pattern class, as described in Vishnu Naresh Bodetti, Takeo Kanade, B. V. K. Vijaya Kumar, *Correlation Filters for Object Alignment*, Proceedings of the IEEE Conference on Computer Vision and Pattern Recognition (2013), which is incorporated herein by reference in its entirety.

To train correlation filters, the AR product recommendation system 102 utilizes training images that include objects with respective object labels that describe the class or type of the object depicted (e.g., table, chair, handbag, etc.). The AR product recommendation system 102 thus utilizes a predetermined number of images of objects of a particular class (e.g., tables) on a monochromatic background where the object is depicted separately in various orientations. To illustrate, for N training images, the correlation filter design problem is posed as an optimization $$\min_{f} \frac{1}{N} \sum_{i=1}^{N} \|x_i \otimes f - g_i\|_2^2 + \lambda \|f\|_2^2$$

where $\otimes$ denotes a convolution operation, $x_i$ is the $i^{th}$ training image, f is a correlation filter template such as a spatial-frequency array or a template in the image domain, $g_i$ is the desired correlation output for the $i^{th}$ training image, and $\lambda$ is the regularization parameter.

Indeed, the AR product recommendation system 102 can solve the above optimization problem to generate the following closed-form expression for a correlation filter:

$$\hat{f} = \left[ \lambda I + \frac{1}{N} \sum_{i=1}^{N} \hat{X}_i^* \hat{X}_i \right]^{-1} \left[ \frac{1}{N} \sum_{i=1}^{N} \hat{X}_i^* \hat{g}_i \right]$$

where $\hat{x}_i$ denotes a Fourier transform of $x_i$, $\hat{X}_i$ denotes the diagonal matrix whose diagonal entries are the elements of $\hat{x}_i$, * denotes a conjugate transpose, and I denotes the identity matrix of appropriate dimensions.

By using the above method to determine a location and an orientation (or pose) of the AR product 402 within the two-dimensional image of the AR screenshot 400, the AR product recommendation system 102 can smartly determine the location and orientation of AR objects that the user 118 places within the real-world environment of the camera feed. Alternatively, for a more deterministic way to determine the location and orientation of the AR product 402, the AR product recommendation system 102 can determine the location of the AR product 402 based on information from the AR client application 110. For instance, the AR product recommendation system 102 can track user input to the AR client application 110 to determine where the user places the AR product 402 and how the use orientates the AR product 402. Indeed, in these embodiments, it may not be necessary to perform an analysis of the two-dimensional AR screenshot 400 because the AR product recommendation system 102 can communicate directly with the AR client application 110 to receive location information and orientation information in relation to the AR product 402.

By utilizing correlation filters, the AR product recommendation system 102 controls the shape of the cross-correlation output between the image (e.g., the AR screenshot 400) and the filter by minimizing the average mean squared error between the cross-correlation output and the ideal desired correlation output for an authentic (or impostor) input image. By explicitly controlling the shape of the entire correlation output using correlation filters, the AR product recommendation system 102 achieve more accurate local estimation that conventional systems that utilize traditional classifiers.

Figure 5A:
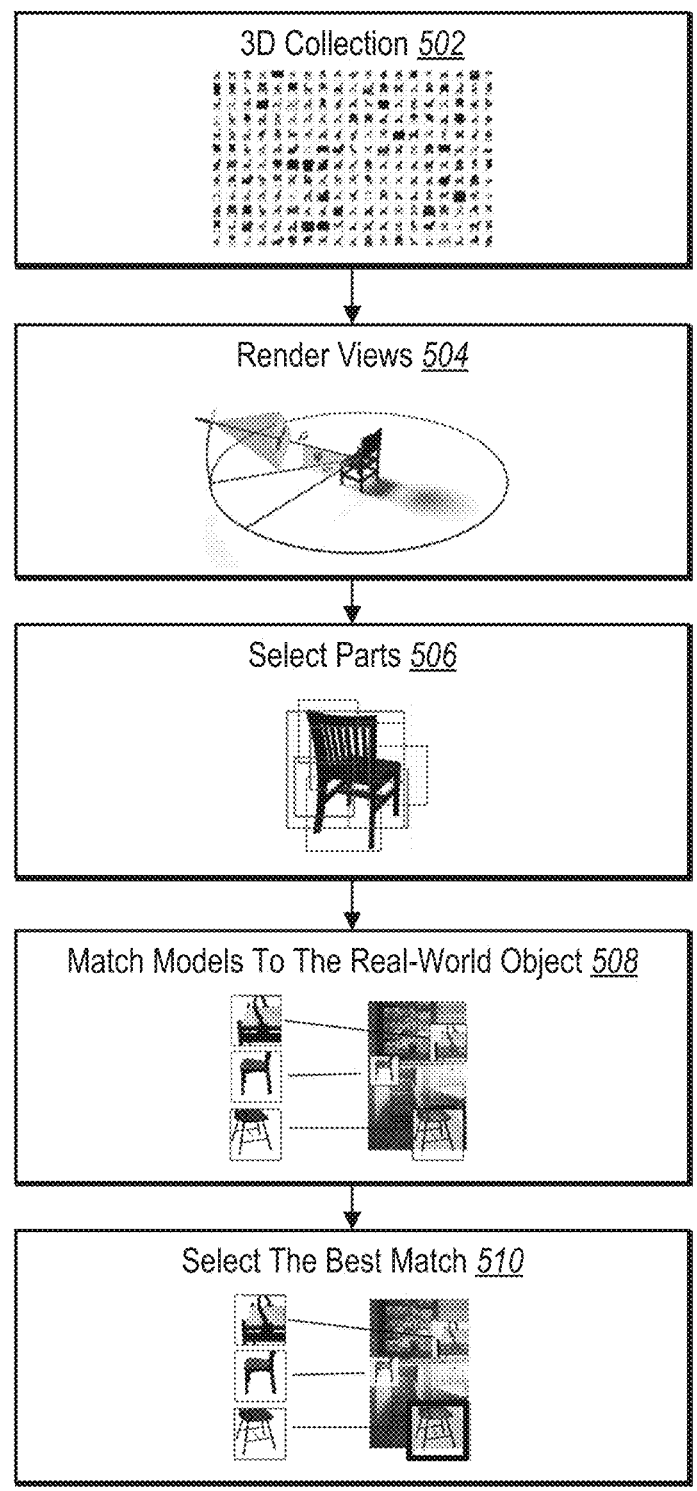
FIGS. 5A-5B illustrate on overview of a process of implementing a 2D-3D alignment algorithm to identify a matching three-dimensional model in accordance with one or more implementations.
Figure 5B:
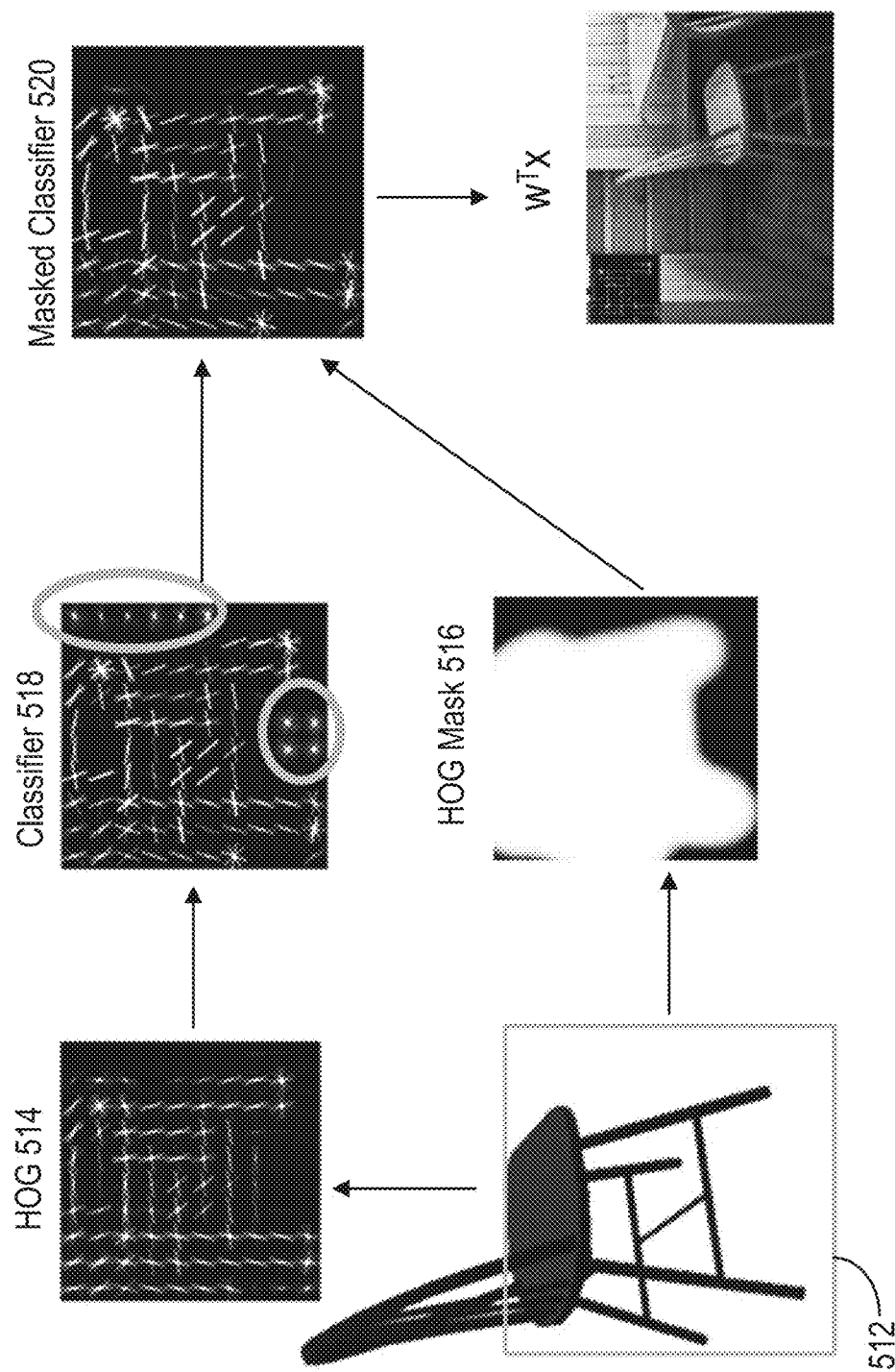

As mentioned, the AR product recommendation system 102 identifies a three-dimensional model that matches the identified real-world object 302. Indeed, FIGS. 5A-5B illustrate a 2D-3D alignment algorithm for identifying a three-dimensional model from the model database 112 that matches the real-world object 302. To illustrate, FIG. 5A shows a flow of a series of acts by which the AR product recommendation system 102 can match a three-dimensional model to a real-world object.

As shown, the AR product recommendation system 102 can access a 3D collection 502 of three-dimensional models within the model database 112. In addition, the AR product recommendation system 102 can select a three-dimensional model from among the plurality of three-dimensional models within the 3D collection 502. To select a matching three-dimensional model, the AR product recommendation system 102 can analyze three-dimensional models within the model database 112 that match the object label associated with the identified real-world object 302. For example, the real-world object 302 has an object label of "chair." Thus, the AR product recommendation system 102 analyzes three-dimensional models that are of the same type or label—the AR product recommendation system 102 analyzes chairs within the model database 112.

In analyzing chairs within the model database 112, the AR product recommendation system 102 analyzes chairs of various styles, each at different orientations to establish part-based correspondences between the three-dimensional models and the real-world object 302. Indeed, the AR product recommendation system 102 can perform act 504 to render various views of a given three-dimensional model. To elaborate, the AR product recommendation system 102 represents a given three-dimensional model using a set of view-dependent mid-level visual elements learned from synthesized views in a discriminative fashion.

To elaborate on how the AR product recommendation system 102 performs act 504 to render various views of a three-dimensional model, the AR product recommendation system 102 searches for a patch x* in the input image (e.g., the viewpoint 300) that maximizes the following linear classifier score that is dependent on q:

$$S_q(x) = w_q^T x$$

where $w_q$ is a vector of learned weights for the classifier dependent on q, wherein the weight $w_q$ emphasizes feature dimensions that are discriminative for a patch's appearance. Indeed, as described in further detail below with reference to FIG. 5B, the AR product recommendation system 102 determines a visual element 512 that corresponds to an identified real-world object based on the classifier score $w_q^T x$.

Given a rendered view for a given three-dimensional model, the AR product recommendation system 102 learns the weights $w_q$ by training an exemplar classifier using the patch q as a single positive example and a large number of negative patches $x_i$ for i=1 to N. In some embodiments, the AR product recommendation system 102 determines $w_q$ analytically via a linear discriminant analysis ("LDA"). Thus, the AR product recommendation system 102 can represent weights by:

$$w_q = \Sigma^{-1}(q - \mu_n)$$

where $$\mu_n = \frac{1}{N} \sum_{i=1}^{N} x_i$$

and the AR product recommendation system 102 estimates $$\Sigma = \frac{1}{N} \sum_{i=1}^{N} (x_i - \mu_n)(x_i - \mu_n)^T$$

from a large set of histogram of oriented gradients ("HOG") descriptors $\{x_i\}$ extracted from patches sampled from a set of negative images.

In addition, the AR product recommendation system 102 further performs act 506 to select parts of a three-dimensional model to test for matching to the real-world object 302. Indeed, the AR product recommendation system 102 calibrates individual element detectors of the 2D-3D alignment algorithm based on a common dataset of negative images (e.g., images that do not contain the real-world object 302 of interest). For instance, the AR product recommendation system 102 utilizes the following affine calibration of the equation mentioned above in relation to act 504:

$$S'_q(x) = a_q S_q(x) + b_q$$

where for each visual element detector the AR product recommendation system 102 seeks to find the scalars $a_q$ and $b_q$.

The AR product recommendation system 102 also matches visual elements of the three-dimensional model to the real-world object 302 for small mutual deformations while preserving viewing angle and style constraints, as shown by act 508 of FIG. 5A. To test a three-dimensional model for similarity to the real-world object 302, the AR product recommendation system 102 applies all learned visual elements of the three-dimensional model to those of the real-world object 302 in parallel. In this manner, the AR product recommendation system 102 determines a spatially consistent and appearance-consistent alignment to the real-world object 302, while preserving style compatibility restraints.

To elaborate on how the AR product recommendation system 102 matches a three-dimensional model to a real-world object 302 based on selected parts, the AR product recommendation system 102 enforces a consistent spatial layout of visual element detections corresponding to a rendered view of a three-dimensional model. More specifically, for all visual elements for a given view of a three-dimensional model, the AR product recommendation system 102 determines a dense response map across different spatial scales of the 2D viewpoint 300. For each visual element, the AR product recommendation system 102 considers the 2D patch locations whose response exceeds a particular threshold, and the AR product recommendation system 102 utilizes these patches to determine detection scores of remaining visual elements centered around their expected 2D locations.

As further illustrated in FIG. 5A, the AR product recommendation system 102 performs act 510 to select the best match for the real-world object 302. Indeed, the AR product recommendation system 102 selects a three-dimensional model that best matches the real-world object 302. As part of identifying a three-dimensional model that matches an identified real-world object, FIG. 5B illustrates applying a histogram of oriented gradients ("HOG") classifier technique to three-dimensional models stored within the model database 112.

As shown, and as described above in relation to FIG. 5A, the AR product recommendation system 102 selects a visual element 512 of a particular three-dimensional model (e.g., the chair illustrated in FIG. 5B). In addition, the AR product recommendation system 102 selects discriminative visual elements by densely determining the squared whitened norm response at multiple spatial scales. In some embodiments, the AR product recommendation system 102 selects a particular number (e.g., 10) of visual elements per rendered 3D view of a three-dimensional model. In particular, the AR product recommendation system 102 selects visual elements that have the highest response after non-maximum suppression.

For non-maximum suppression, the AR product recommendation system 102 can implement an appropriate intersection-area-to-union ratio (e.g., 0.25). The AR product recommendation system 102 can further utilize square patches of particular dimensions (e.g., 100 by 100 pixels) to select visual elements (e.g., visual element 512). By filtering visual elements in this way, the AR product recommendation system 102 removes small, spurious patches that could be considered "noise" in the analysis.

The AR product recommendation system 102 further applies an HOG 514 to extract contrast-insensitive features from HOG cells of a given dimension (e.g., 10 by 10 pixels) to product a feature vector of a particular dimension (e.g., 900 dimensions). The AR product recommendation system 102 can also set to zero components of $w_q$ that correspond to spatial bins that have a sum of absolute values across the HOG channels less than a given value (e.g., 0.01). For example, the AR product recommendation system 102 can apply an HOG mask 516 to the visual element 512 as illustrated in FIG. 5B.

Thus, the AR product recommendation system 102 can generated a masked classifier 520 based on a classifier 518 applied to the HOG 514. By applying the HOG mask 516, the AR product recommendation system 102 can reduce the effect of gradients in the classifier 518 that are not relevant to the visual element 512 (e.g., the circled gradients shown in the classifier 518). Indeed, by applying the HOG mask 516, the AR product recommendation system 102 thereby effectively downweights background (e.g., white) pixels within the rendered views and focuses detector weights on the foreground three-dimensional model (e.g., the chair). Accordingly, the AR product recommendation system 102 generates the masked classifier 520 to identify a visual element (e.g., visual element 512) that corresponds to an identified real-world object based on the classifier score $w_q^T x$.

In some embodiments, the AR product recommendation system utilizes the 2D-3D alignment algorithm described in Mathieu Aubry, Daniel Maturana, Alexei A. Efros, Bryan C. Russell, Josef Sivic, *Seeing 3D Chairs: Exemplar Part-based 2D-3D Alignment Using a Large Dataset of CAD Models*, CVPR (2014), which is incorporated by reference herein in its entirety.

Figure 6:
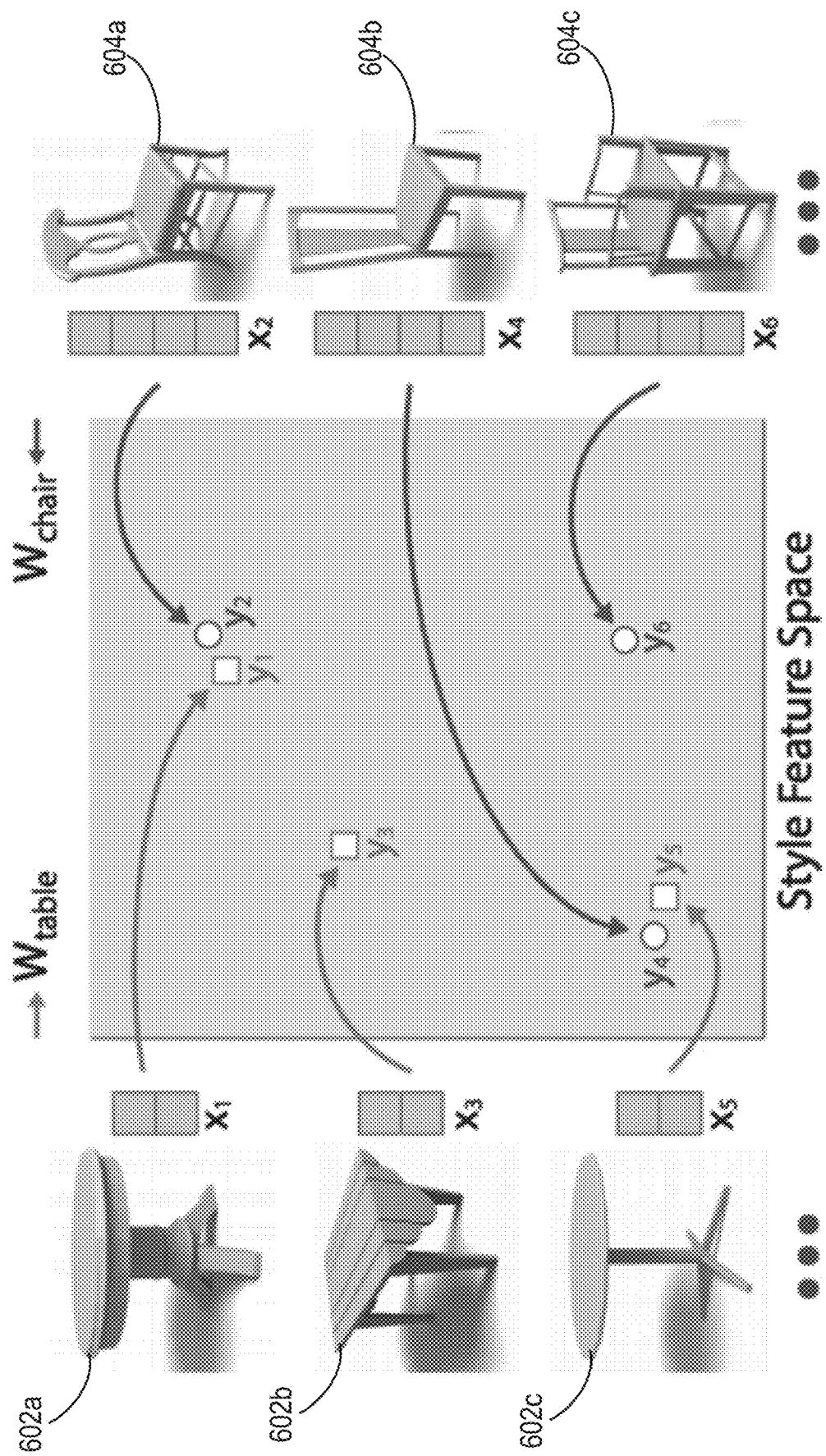
FIG. 6 illustrates an overview of a process of utilizing a style compatibility algorithm to identify a compatible recommended product in accordance with one or more implementations.

As mentioned, the AR product recommendation system 102 further generates recommended products based on style compatibility. Indeed, FIG. 6 illustrates a visual representation of utilizing a style compatibility algorithm to generate recommended products. In particular, the AR product recommendation system 102 analyzes a plurality of products stored within the product database 114 to determine, for product, a probability of being stylistically compatible with a given three-dimensional model. In addition, the AR product recommendation system 102 ranks products based on their relevance to the user 118—i.e., based on their respective probabilities with respect to a given three-dimensional model. Generally, a user will prefer products that are stylistically compatible with existing real-world objects in the viewpoint 300.

To elaborate on implementing the style compatibility algorithm, the AR product recommendation system 102 utilizes crowdsourced preference data (e.g., collected via AMAZON MECHANICAL TURK) about which products people consider to be compatible. The AR product recommendation system 102 performs a consistent segmentation of 3D models of products within a single product class and determines a part-aware geometric feature vector for each product model. In addition, the AR product recommendation system 102 trains a compatibility model based on a compatibility metric using the part-aware geometric features and crowdsourced preferences.

More specifically, the AR product recommendation system 102 collects data for determining object compatibility using crowdsourcing techniques. To illustrate, the AR product recommendation system 102 utilizes a crowdsourcing platform such as AMAZON MECHANICAL TURK to gather user preferences in the form of triplets (e.g., A, B, C). Each triplet represents a human evaluation of whether reference product/object A is more compatible with product/object B or with product/object C. For example, the AR product recommendation system 102 can present a question to a rating user such as, given sofa A, is chair B or chair C more compatible? Generally, product/object B and product/object C are in the same product class (e.g., chair) while product/object A is from a different product class (e.g., sofa).

Based on the crowdsourced compatibility data, the AR product recommendation system 102 generates a feature vector x of geometric properties that are indicative of a style of a product or object. For instance, as part of the style compatibility algorithm, the AR product recommendation system 102 performs a consistent segmentation of all products/objects within the same product class and generates geometric features for each segmented part individually. The AR product recommendation system 102 further represents each product by concatenating feature vectors that represent the geometric features for all parts of the product as well as its entire shape. Advantageously, the AR product recommendation system 102 thus maintains distinctive features separately without blending features of a product together. As a result, the AR product recommendation system 102 generates a part-aware geometric feature vector that is better suited for characterizing styles of products and/or objects.

Given the crowdsourced triplet data and the part-aware geometric features, the AR product recommendation system 102 learns a measure of compatibility between a pair of products from different product classes. To illustrate, let $x_i$, $x_1$ be feature vectors for products i and j (possibly of different dimensionalities), respectively. Accordingly, $d(x_i, x_1)$ denotes a distance function whereby the AR product recommendation system 102 can determine a compatibility distance, where lower distances correspond to a higher compatibility. Indeed, the AR product recommendation system 102 can determine a compatibility distance given by:

$$d_{asymm}(x_i, x_j) = \|W_{c(i)} x_i - W_{c(j)} x_j\|_2$$

where $W_c$ is represented as a K×D embedding matrix that projects the input feature into a K-dimensional space for comparison. In order to process heterogeneous product classes, the AR product recommendation system 102 learns separate embedding matrix $W_c$ for each class c.

In other words, the AR product recommendation system 102 compares products by projecting them into a shared K-dimensional embedding space while using a separate projection matrix for each product class. To illustrate from FIG. 6, the AR product recommendation system 102 projects a table 602a (represented by the feature vector $x_1$) as $y_1 = W_{table} x_1$ in feature space. The AR product recommendation system 102 further compares the table 602a with a chair 604a (represented by the feature vector $x_2$) that the AR product recommendation system 102 projects in the style feature space as $y_2 = W_{chair} x_2$. Indeed, the AR product recommendation system 102 can compare the table 602a with the chair 604a by determining the asymmetric embedding distance between $y_1$ and $y_2$ in the style feature space.

In addition, given the identified real-world objects (e.g., objects 302 and 304) from the viewpoint 300, the AR product recommendation system 102 further determines a compatibility energy for the entire scene depicted by the viewpoint 300. Indeed, the AR product recommendation system 102 determines the compatibility score (i.e., a compatibility energy) as the sum of compatibility distances between all objects identified in the viewpoint 300, given by:

$$F(\{x_i\}) = \sum_{(x_i, x_j) \in \mathcal{P}} d(x_i, x_j)$$

where $\{x_i\}$ is a set of identified objects in the viewpoint 300, $\mathcal{P}$ is a set of linked object pairs, and $d(x_i, x_1)$ is the compatibility distance between $x_i$ and $x_j$. Thus, given a particular product class of an AR product (e.g., AR product 402), the AR product recommendation system 102 can enumerate all candidate products within that product class in descending order of compatibility energy/score F.

By following this process, as illustrated in FIG. 6, the AR product recommendation system 102 can compare objects/products from different classes. Indeed, as shown, the AR product recommendation system 102 can compare tables 602a, 602b, and 602c with chairs 604a, 604b, and 604c by determining distances between respective feature space projections. For instance, the AR product recommendation system 102 can determine a compatibility score between the table 602c and the chair 604b and can determine another compatibility score between the table 602c and the chair 604c to determine that chair 604b is more compatible with table 602c—because $y_4$ is closer than $y_6$ to $y_5$.

In some embodiments, in relation to the discussion of FIG. 6, the AR product recommendation system utilizes the style compatibility algorithm described in Tianqiang Liu, Aaron Hertmann, Wilmot Li, Thomas Funkhouser, *Style Compatibility for 3D Furniture Models*, ACM Transactions on Graphics (2015), which is incorporated herein by reference in its entirety.

Figure 7:
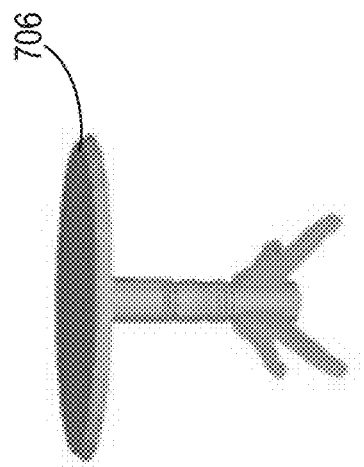
FIG. 7 illustrates example recommended products in accordance with one or more implementations.
Figure 7:
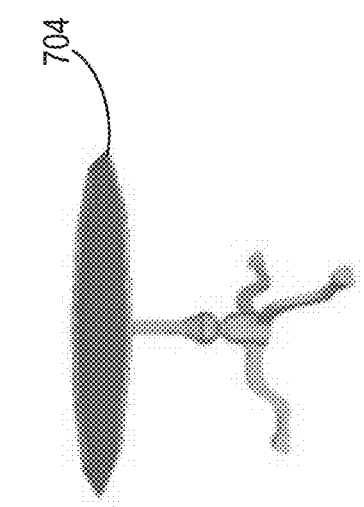
Figure 7:
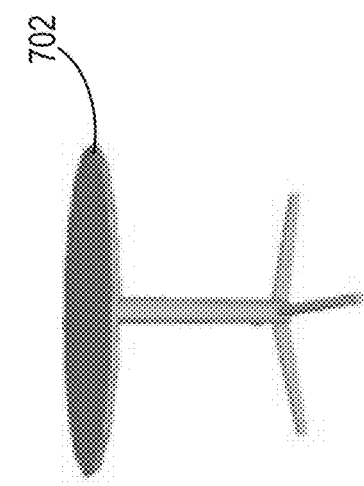

As mentioned, the AR product recommendation system 102 selects products to recommend to the user 118. Indeed, FIG. 7 illustrates products 702, 704, and 706 that the AR product recommendation system 102 selects as recommended products based on analyzing the viewpoint 300 to identify the real-world object 302. To illustrate, the AR product recommendation system 102 ranks a plurality of products within the product database 114 according to their respective compatibility scores. In some embodiments, the AR product recommendation system 102 selects a fixed number of top-ranked products as recommendations to provide to the user client device 108 (e.g., as emails, push notifications, or via the AR client application 110).

As shown, the AR product recommendation system 102 selects models of three products (product 702, product 704, and product 706) from the product database 114. Indeed, the AR product recommendation system 102 can select a given number of products that are highest-ranked. In some embodiments, the AR product recommendation system 102 can receive a user input to set the number (e.g., 1, 2, 3, 10) of products to provide as recommendations. In other embodiments, the AR product recommendation system 102 can generate a predetermined number of product recommendations (e.g., as defined by an administrator). In still other embodiments, the AR product recommendation system 102 can generate a number of recommended products based on a total number of products of the given product class stored within the product database 114. Indeed, the AR product recommendation system 102 can generate a number of product recommendations that is a percentage (e.g., 0.01%, 0.5%, 1%, 10%.) of the total number of products within a given product class.

Figure 8A:
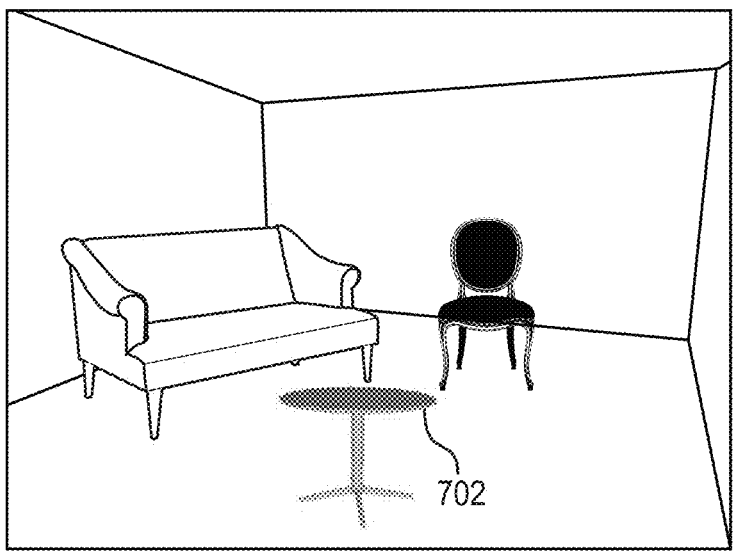
FIGS. 8A-8C illustrate AR scenes including AR representations of recommended products within a real-world environment in accordance with one or more implementations.

In addition to generating the recommended products 702, 704, and 706, the AR product recommendation system 102 can provide the recommended products to the user client device 108 as AR representations overlaid on the real-world environment of the camera feed. Indeed, FIGS. 8A-8C illustrate providing AR representations of recommended products to the user client device 108.

As shown, the AR product recommendation system 102 can generate a three-dimensional AR representation using stored three-dimensional models of products within the product database 114. For example, as illustrated in FIG. 8A, the AR product recommendation system 102 can overlay the product 702 on a view of the real-world environment 800 of the camera feed. The AR product recommendation system 102 can generate the AR representation of the product 702 and can place the AR representation to be world-fixed so that it appears placed at a particular location within the real-world environment. Indeed, as described above, the AR product recommendation system 102 can place the recommended AR product 702 using a location and an orientation determined based on the AR product 402 placed by the user 118.

Figure 8B:
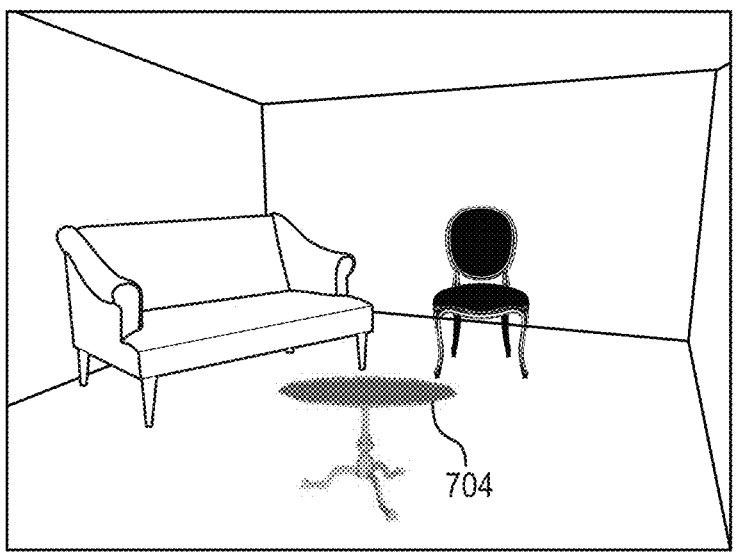
Figure 8C:
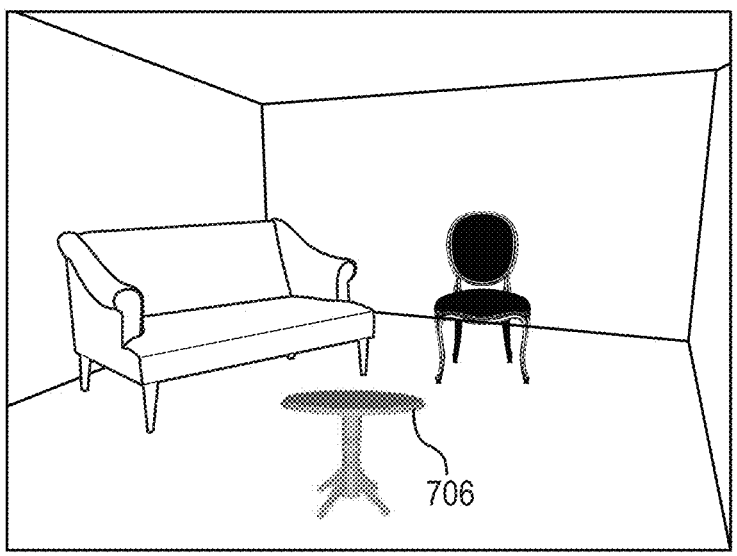

FIGS. 8B and 8C illustrate similar AR products 704 and 706 that the AR product recommendation system 102 generates and provides to the user client device 108. In some embodiments, the AR product recommendation system 102 can provide, via a user interface of the AR client application 110, multiple recommended products at once. Indeed, the AR product recommendation system 102 can provide the AR products 702, 704, and 706 within a single user interface. In other embodiments, the AR product recommendation system 102 provides only a single AR product at a time. In these embodiments, the AR product recommendation system 102 can enable the user to choose and alternate between AR products to see what each one would look like when placed in the real-world environment of the camera feed.

To generate the AR representations of the products 702-706, the AR product recommendation system can utilize an embedding technique and a color compatibility algorithm to generate accurate representations that fit the real-world environment. To illustrate, the AR product recommendation system 102 embeds the candidate recommended products in available textures within the frame of the camera feed captured to determine the viewpoint. In addition, the AR product recommendation system 102 normalizes all candidate recommendations to have the reference in terms of rotation, translation, and scale. In some embodiments, the AR product recommendation system 102 can access a third-party service (e.g., an API) to normalize recommended product representations with proper rotation, translation, and scale.

As mentioned, the AR product recommendation system 102 further implements a color compatibility algorithm. Indeed, the AR product recommendation system 102 utilizes a color compatibility algorithm to select textures that are color-compatible with the scene depicted within the viewpoint 300. As part of the color compatibility algorithm, the AR product recommendation system 102 determines a color compatibility measure by extracting a theme of a given number (e.g., five) colors from an AR representation of a recommended product. To extract the color theme, the AR product recommendation system 102 minimizes an objective function to represent or suggest an image:

$$\max_t \alpha \cdot r(t) - \frac{1}{N} \sum_i \min_{1 \le k \le 5} (\max(\|c_i - t_k\|_2, \sigma)) - \frac{\tau}{M} \max_k \sum_{j \in N(t_k)} \max(\|c_j - t_k\|_2, \sigma)$$

where r(t) is a rating of theme t, $c_i$ is a pixel color, $t_k$ is a theme color, N is the total number of pixels, σ is a distance threshold, and $\alpha$ and $\tau$ are the learning rate parameters. By utilizing the first term, $$\max_t \alpha \cdot r(t),$$

the AR product recommendation system 102 measures the quality of the extracted theme. By utilizing the second term, $$\frac{1}{N}\sum_i \min_{1 \le k \le 5}(\max(\|c_i - t_k\|_2, \sigma)),$$

the AR product recommendation system penalizes dissimilarity between each image pixel $c_i$ and the most similar color $t_k$ within the theme. By utilizing the third term $$\frac{\tau}{M}\max_k \sum_{j \in N(t_k)} \max(\|c_j - t_k\|_2, \sigma),$$

the AR product recommendation system 102 penalizes dissimilarity between theme colors $t_k$ and the M most similar image pixels N(t) to prevent theme colors from drifting from the image. In some embodiments, the AR product recommendation system 102 uses set values such as M=N/20, $\tau$=0.025, $\alpha$=3, and $\sigma$=5. In addition, the AR product recommendation system 102 can utilize a DIRECT algorithm for optimization to perform a deterministic global search without requiring overly-intensive initialization. For example, the AR product recommendation system 102 can utilize the DIRECT algorithm as set forth in Donald R. Jones, Cary D. Perttunen, Bruce E. Stuckman, *Lipschitzian Optimization Without the Lipschitz Constant*, Journal of Optimization Theory and Applications 79.1, 157-181 (1993), which is incorporated herein by reference in its entirety.

The AR product recommendation system 102 thus generates themes of a set number of colors (e.g., five) and scores each theme using a regression model. Indeed, the AR product recommendation system 102 generates, from an input theme t, a feature vector of a number (e.g., 326) of features including colors, differences, principal component analysis ("PCA") features, hue probability, hue entropy, etc.

In addition, the AR product recommendation system 102 can utilize a LASSO ("least absolute shrinkage and selection operator") regression model with an L1 norm on the weights to apply to the generated feature vector y(t). In this manner, the AR product recommendation system 102 automatically selects the most relevant features and rates a given color theme on a scale from 1 to 5. The AR product recommendation system 102 can utilize a LASSO regressor that is a linear function of the features given by:

$$r(t)=w^T y(t)+b$$

learned with L1 regularization:

$$\min_{w,b} \sum_i (w^T y_i + b - r_i)^2 + \lambda \|w\|_1$$

where r(t) is the predicted rating of the input theme, and w and b are the learned parameters. Thus, for each embedded real-world object corresponding to a candidate recommendation within the viewpoint 300, the AR product recommendation system extracts a theme and passes the theme through the regression model. Accordingly, for the $i^{th}$ candidate, if $t_i$ is the extracted theme, the AR product recommendation system 102 associates a normalized score $\beta_i$ that denotes its color compatibility with the viewpoint 300 on a scale from 0 to 1. In some embodiments, the AR product recommendation system 102 generates the color compatibility as follows:

$$\beta_i = \frac{r(t_i) - 1}{5 - 1}$$

where the user-based ratings range from 1 to 5. In this way, the AR product recommendation system 102 generates the color compatibility score by subtracting the rating by a minimum possible rating and then dividing the result by the difference of the maximum possible rating and a minimum possible rating (e.g., 5-1). Based on the resulting scores, the AR product recommendation system 102 ranks textures and selects a number of top-ranked textures to use for generating the AR representations of products 702-706.

In some embodiments, the AR product recommendation system 102 utilizes the color compatibility algorithm set forth in Peter O'Donovan, Aseem Agarwala, Aaron Hertmann, *Color Compatibility from Large Datasets*, ACM Transactions on Graphics, 30, 43, Proc. SIGGRAPH (2011), which is incorporated herein by reference in its entirety.

Figure 9:
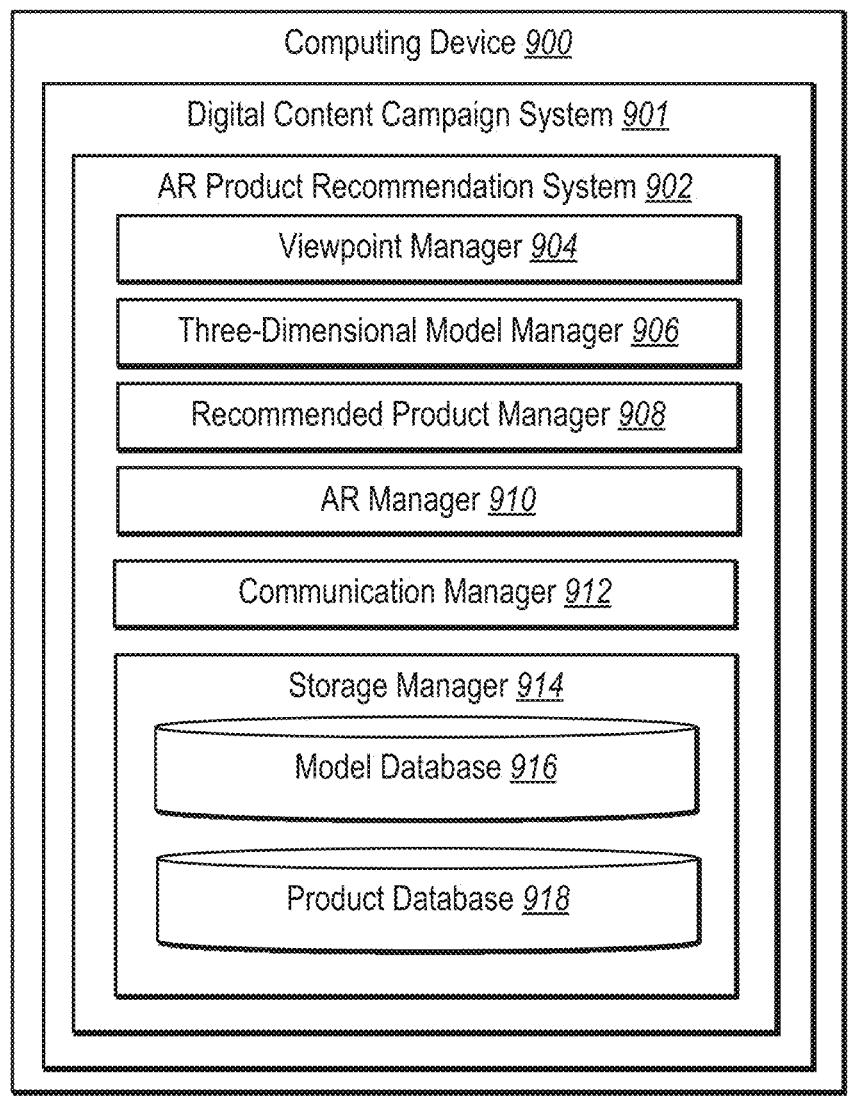
FIG. 9 illustrates a schematic diagram of a AR product recommendation system in accordance with one or more implementations.

Looking now to FIG. 9, additional detail will be provided regarding components and capabilities of the AR product recommendation system 902 (e.g., the AR product recommendation system 102). Specifically, FIG. 9 illustrates an example schematic diagram of the AR product recommendation system 902 on an example computing device 900 (e.g., one or more of the user client device 108 and/or server(s) 104). As shown in FIG. 9, the AR product recommendation system 102 may include a viewpoint manager 904, a three-dimensional model manager 906, a recommended product manager 908, an AR manager 910, a communication manager 912, and a storage manager 914.

As mentioned, the AR product recommendation system 902 can include a viewpoint manager 904. In particular, the viewpoint manager 904 can receive and analyze a camera feed to detect, identify, generate, or otherwise determine a viewpoint associated with the camera feed. Indeed, as described above, the viewpoint manager 904 can access accelerometer data or other motion-related data associated with a user client device to determine a time instant where the user client device is sufficiently still to capture a frame of the camera feed. In addition, the viewpoint manager 904 can analyze the viewpoint to identify, locate, detect, or determine real-world objects within a viewpoint.

In addition, the viewpoint manager 904 can also identify, determine, or generate an AR screenshot. In particular, the viewpoint manager 904 can capture a frame of an AR application session that includes a view of an AR product placed within a real-world environment of the camera feed. Thus, the viewpoint manager 904 can utilize a single captured frame for the viewpoint and the AR screenshot, where the viewpoint does not include a view of an overlaid AR product within the real-world environment and the AR screenshot does include the AR product.

As shown, the AR product recommendation system 902 further includes a three-dimensional model manager 906. The three-dimensional model manager 906 can communicate with the viewpoint manager 904 to search for, identify, determine, or generate a three-dimensional model that matches an identified real-world object. For example, the three-dimensional model manager 906 can communicate with the storage manager 914 to access the model database 916 (e.g., the model database 112) to search for and identify a three-dimensional model from within the model database 916. Indeed, as described above, the three-dimensional model manager 906 can utilize a 2D-3D alignment algorithm to identify a three-dimensional model that matches an object identified within the viewpoint.

As further shown, the AR product recommendation system 902 includes a recommended product manager 908. In particular, the recommended product manager 908 can search for, locate, identify, determine, produce, or generate recommended products based on a given three-dimensional model. For example, the recommended product manager 908 can communicate with the storage manager 914 to access the product database 918 to identify one or more products that are compatible with a given three-dimensional model. As described herein, the recommended product manager 908 can utilize a style compatibility algorithm to generate recommended products that match a style of a particular three-dimensional model.

Additionally, the AR product recommendation system 902 includes an AR manager 910. In particular, the AR manager 910 can render, produce, or otherwise generate AR representations of recommended products. Indeed, the AR manager 910 can communicate with the recommended product manager 908 to generate an AR representation of a product that the recommended product manager 908 identifies as a stylistically compatible product. Accordingly, the AR manager 910 can generate an AR scene that includes a viewpoint or real-world environment of the camera feed in addition to the AR representation of the recommended product.

As further illustrated in FIG. 9, the AR product recommendation system 902 includes a communication manager 912. In particular, the communication manager 912 can communicate or interface with a user client device to transmit and/or receive data such as a camera feed, a viewpoint, an AR screenshot, an AR representation of a recommend product, etc. Indeed, the communication manager 912 can facilitate providing an AR scene to a user client device whereby a user can experience a recommended product rendered to appear within a real-world environment displayed by way of the user client device.

In one or more embodiments, each of the components of the AR product recommendation system 902 are in communication with one another using any suitable communication technologies. Additionally, the components of the AR product recommendation system 902 can be in communication with one or more other devices including one or more user client devices described above. It will be recognized that although the components of the AR product recommendation system 902 are shown to be separate in FIG. 9, any of the subcomponents may be combined into fewer components, such as into a single component, or divided into more components as may serve a particular implementation. Furthermore, although the components of FIG. 9 are described in connection with the AR product recommendation system 902, at least some of the components for performing operations in conjunction with the AR product recommendation system 902 described herein may be implemented on other devices within the environment.

The components of the AR product recommendation system 902 can include software, hardware, or both. For example, the components of the AR product recommendation system 902 can include one or more instructions stored on a computer-readable storage medium and executable by processors of one or more computing devices (e.g., the computing device 900 or the computing device 1200 of FIG. 12). When executed by the one or more processors, the computer-executable instructions of the AR product recommendation system 902 can cause the computing device 1200 to perform the methods described herein. Alternatively, the components of the AR product recommendation system 902 can comprise hardware, such as a special purpose processing device to perform a certain function or group of functions. Additionally or alternatively, the components of the AR product recommendation system 902 can include a combination of computer-executable instructions and hardware.

Furthermore, the components of the AR product recommendation system 902 performing the functions described herein may, for example, be implemented as part of a stand-alone application, as a module of an application, as a plug-in for applications including content management applications, as a library function or functions that may be called by other applications, and/or as a cloud-computing model. Thus, the components of the AR product recommendation system 902 may be implemented as part of a stand-alone application on a personal computing device or a mobile device. Alternatively or additionally, the components of the AR product recommendation system 902 may be implemented in any application that allows creation and delivery of marketing content to users, including, but not limited to, applications in ADOBE CREATIVE CLOUD and/or ADOBE MARKETING CLOUD, such as ADOBE CAMPAIGN, ADOBE ANALYTICS, and ADOBE MEDIA OPTIMIZER. "ADOBE," "CREATIVE CLOUD," "MARKETING CLOUD," "CAMPAIGN," "ANALYTICS," and "MEDIA OPTIMIZER," are registered trademarks of Adobe Systems Incorporated in the United States and/or other countries.

FIGS. 1-9, the corresponding text, and the examples provide a number of different systems, methods, and non-transitory computer readable media for generating and providing AR representations of recommended products based on style compatibility with real-world surroundings. In addition to the foregoing, embodiments can also be described in terms of flowcharts comprising acts for accomplishing a particular result. For example, FIG. 10 illustrates a flowchart of an example sequence of acts in accordance with one or more embodiments.

Figure 10:
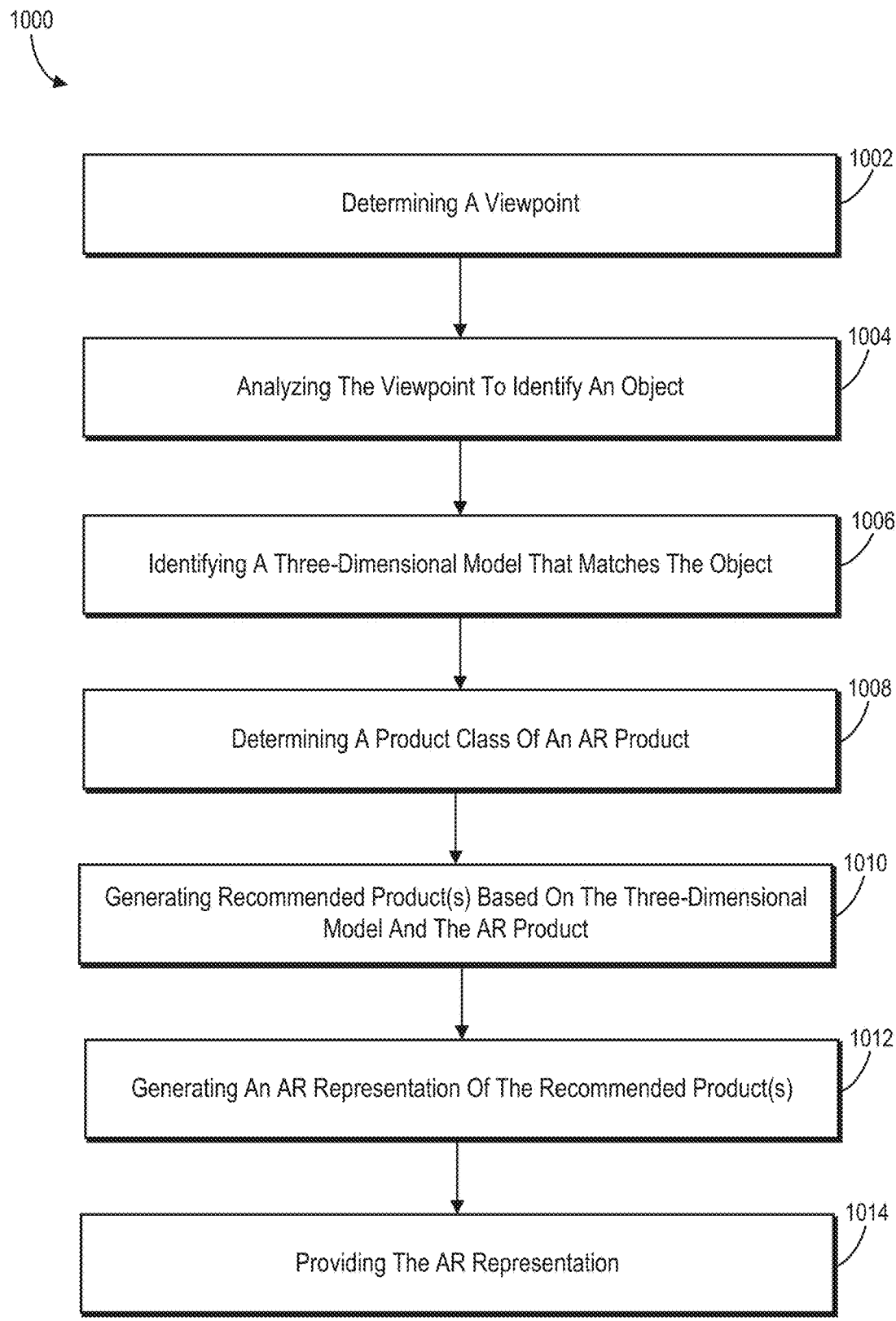
FIG. 10 illustrates a flowchart of a series of acts for generating an AR representation of a recommended product in accordance with one or more implementations.

While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 of generating and providing an AR representation of a recommended product based on style compatibility with real-world surroundings. In particular, the series of acts 1000 can include an act 1002 of determining a viewpoint. For example, the act 1002 can involve determining, based on a camera feed received from the user client device, a viewpoint that depicts a real-world environment associated with the user client device. The act 1002 can further involve selecting a time instant during an application session associated with the user client device where the user client device satisfies a stillness threshold and capturing a frame of the camera feed at the time instant. In addition, the act 1002 can involve accessing accelerometer information associated with the user client device. Alternatively, the act 1002 can involve utilizing a probabilistic model to determine a frame of the camera feed that depicts a style for matching the one or more recommended products.

As illustrated in FIG. 10, the series of acts 1000 further includes an act 1004 of analyzing the viewpoint to identify an object. In particular, the act 1004 can involve analyzing the viewpoint to identify a real-world object depicted within the viewpoint. The act 1004 can further involve utilizing a neural network to generate proposed regions of the viewpoint with corresponding probabilities of containing objects.

In addition, the series of acts 1000 includes an act 1006 of identifying a three-dimensional model that matches the object. In particular, the act 1006 can involve identifying, from a model database, a three-dimensional model that matches the identified real-world object. The act 1006 can further involve implementing a 2D-3D alignment algorithm to determine, for each of a plurality of three-dimensional models with the model database, an alignment relative to the identified real-world object.

As shown, the series of acts 1000 further includes an act 1008 of determining a product class of an AR product. In particular, the act 1008 can involve determining a product class of an augmented reality product overlaid on the real-world environment of the camera feed. The series of acts 1000 can further include an act of determining, in relation to the real-world environment, a location and an orientation of the overlaid augmented reality product.

As further shown, the series of acts 1000 can include an act 1010 of generating recommended product(s) based on the three-dimensional model and the AR product. In particular, the act 1010 can involve generating, utilizing a style compatibility algorithm, one or more recommended products based on style compatibility in relation to the three-dimensional model and further based on the product class associated with the overlaid augmented reality product. The act 1010 can further involve identifying products within the same product class as the overlaid augmented reality product. In addition, the act 1010 can involve determining compatibility scores for a plurality of products within a product database, wherein the compatibility scores are based on comparing geometric features of the three-dimensional model with geometric features of the plurality of products.

The series of acts 1000 can include an act 1012 of generating an AR representation of the recommendation product(s). In particular, the act 1012 can involve generating an augmented reality representation of the one or more recommended products for display. The act 1012 can further involve replacing, as an overlay within the real-world environment of the camera feed, the overlaid augmented reality with the augmented reality representation of the one or more recommended products and positioning the augmented reality representation of the one or more recommended products to match the location and the orientation of the overlaid augmented reality product. In addition, the act 1012 can involve utilizing a color compatibility algorithm to, based on identifying colors within the viewpoint, determine one or more colors for the augmented reality representation of the one or more recommended products.

In addition, the series of acts 1000 can include an act 1014 of providing the AR representation. In particular, the act 1014 can involve providing the augmented reality representation as an overlay within the real-world environment of the camera feed.

Figure 11:
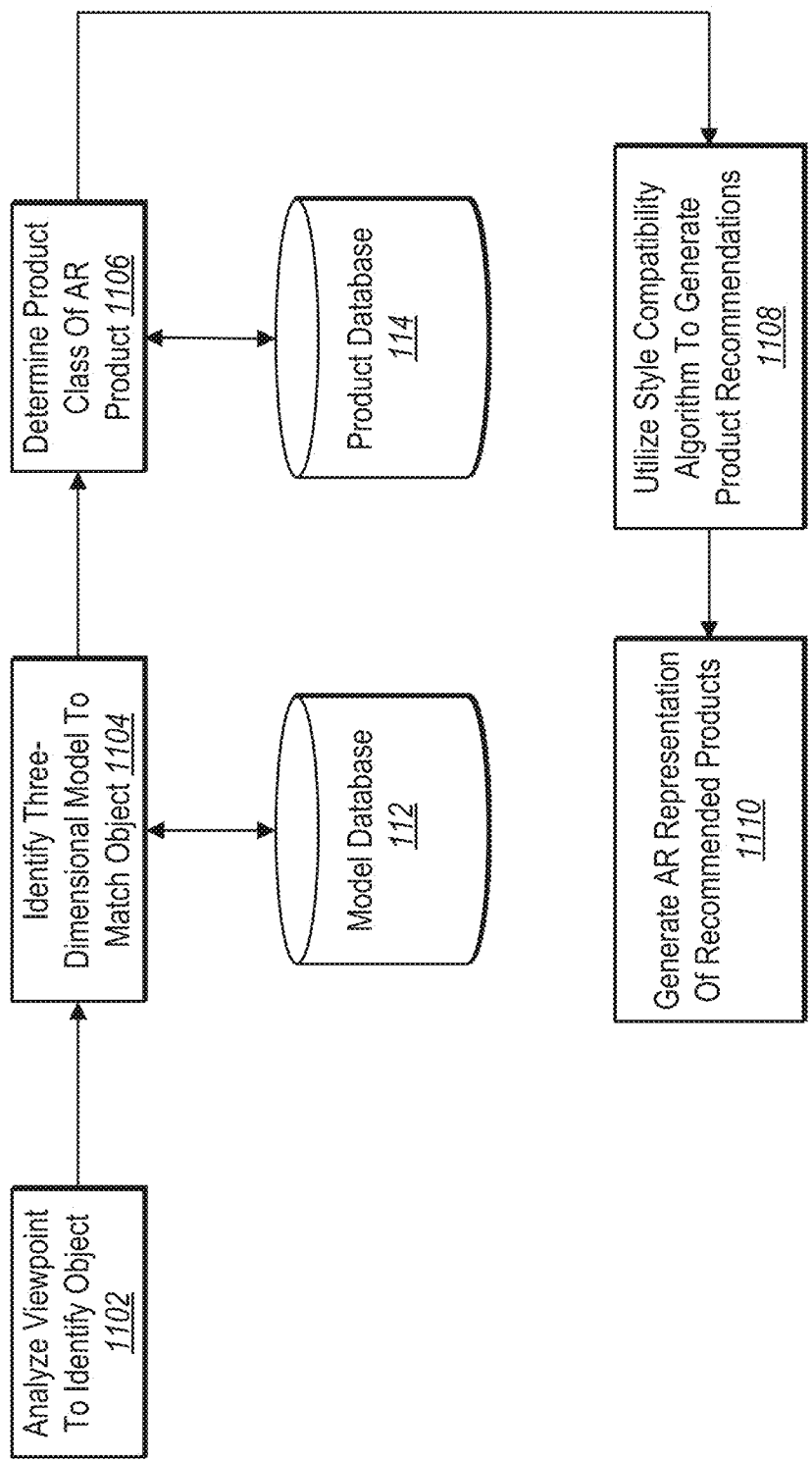
FIG. 11 illustrates corresponding structure for a step for generating an augmented reality representation of one or more recommended products based on a three-dimensional model that matches a style of real-world objects depicted within the viewpoint in accordance with one or more implementations.

As mentioned, the AR product recommendation system 102 generates an AR representation of a recommended product based on style compatibility in relation to real-world surroundings. Indeed, FIG. 11 illustrates structure for performing a step for generating an AR representation of one or more recommended products based on a three-dimensional model that matches a style of real-world objects depicted within the viewpoint.

As illustrated, the step for generating the AR representation can include acts 1102-1110. In particular, the AR product recommendation system 102 can perform act 1102 to analyze a viewpoint. As described above, the AR product recommendation system 102 can determine a viewpoint from a camera feed associated with a user client device. For instance, the AR product recommendation system 102 can capture a frame of the camera feed at a time instant where the user client device satisfies a stillness threshold. Additional methods to determine a viewpoint are described above in relation to previous figures.

As shown, the AR product recommendation system 102 performs act 1102 to analyze the determined viewpoint. In particular, the AR product recommendation system 102 analyzes the viewpoint to identify real-world objects within the viewpoint in accordance with object detection techniques such as the region proposal network described above.

As further shown, the AR product recommendation system 102 performs act 1104 to identify a three-dimensional model. As described above, the AR product recommendation system 102 searches a model database 112 to identify a three-dimensional model that matches a real-world object identified within the viewpoint. For example, the AR product recommendation system 102 implements a 2D-3D alignment algorithm to identify a three-dimensional model that aligns with or matches an identified real-world object.

FIG. 11 further illustrates that the AR product recommendation system 102 further performs 1106 to determine a product class of an AR product. Indeed, as described above, the AR product recommendation system 102 can identify a product class of an AR product that a user selects to overlay on a view of a real-world environment as shown via an AR client application. For example, the AR product recommendation system 102 can access a product database 114 to determine product class information for a selected AR product.

Additionally, the AR product recommendation system 102 can perform act 1108 to utilize a style compatibility algorithm to generate product recommendations. As described in further detail above, the AR product recommendation system 102 can generate recommended products by identifying products that have a style or visual appearance that is compatible with an identified three-dimensional model. Thus, by identifying a three-dimensional model that matches a real-world object and by further identifying products that match the three-dimensional model, the AR product recommendation system 102 generates recommended products that match the real-world object identified in the viewpoint.

As illustrated, the AR product recommendation system 102 can further perform act 1110 to generate an AR representation of recommended products. More specifically, the AR product recommendation system 102 generates AR models to represent products that the AR product recommendation system 102 identifies as matching the three-dimensional model of the identified real-world object. For instance, the AR product recommendation system 102 utilizes an embedding technique and a color compatibility algorithm to generate an AR representation to place within a view of the real-world environment presented to a user. Accordingly, the AR product recommendation system 102 generates an AR representation of a product that matches a style shown in the viewpoint.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
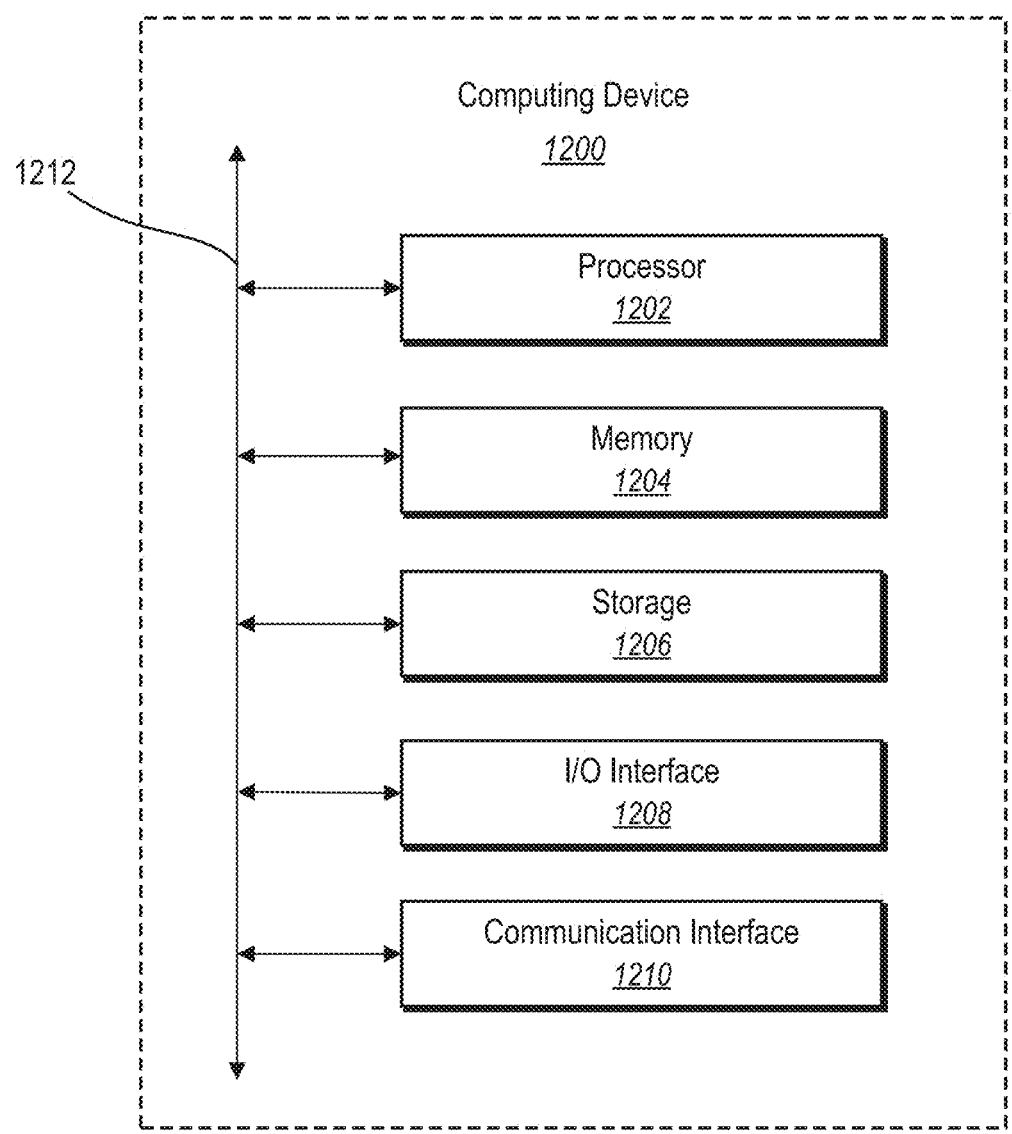
FIG. 12 illustrates a block diagram of an example computing device in accordance with one or more implementations.

FIG. 12 illustrates, in block diagram form, an example computing device 1200 (e.g., computing device 900, user client device 108, and/or server(s) 104) that may be configured to perform one or more of the processes described above. One will appreciate that the AR product recommendation system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1100 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium for generating a three-dimensional digital representation of a product based on a similarity to real-world surroundings of a user, the non-transitory computer readable medium comprising instructions that, when executed by at least one processor, cause a user client device to:
    determine, based on a camera feed received from the user client device, a viewpoint that depicts a real-world environment associated with the user client device;
    analyze the viewpoint to identify a real-world object depicted within the viewpoint;
    identify, from a model database, a three-dimensional model that matches the identified real-world object;
    determine a product class of an augmented reality product overlaid on the real-world environment of the camera feed;
    generate, utilizing a style compatibility algorithm to compare part-aware geometric feature vectors of the augmented reality product and the three-dimensional model, one or more recommended products based on style compatibility in relation to the three-dimensional model and further based on the product class associated with the overlaid augmented reality product;
    generate an augmented reality representation of the one or more recommended products for display; and
    provide the augmented reality representation for display as an overlay together with the real-world object within the real-world environment of the camera feed.

2. The non-transitory computer readable medium of claim 1, wherein the instructions cause the user client device to generate the one or more recommended products by identifying products within the same product class as the overlaid augmented reality product.

3. The non-transitory computer readable medium of claim 1, further comprising instructions that, when executed by the at least one processor, cause the user client device to:

determine, in relation to the real-world environment, a location and an orientation of the overlaid augmented reality product by utilizing one or more correlation filters; and save the location and the orientation.

4. The non-transitory computer readable medium of claim 3, wherein the instructions cause the user client device to generate the augmented reality representation of the one or more recommended products by:
replacing, in relation to the real-world environment of the camera feed, the overlaid augmented reality product with the augmented reality representation of the one or more recommended products; and
positioning the augmented reality representation of the one or more recommended products to match the location and the orientation of the overlaid augmented reality product.

5. The non-transitory computer readable medium of claim 4, wherein the instructions cause the user client device to generate the augmented reality representation of the one or more recommended products by further utilizing a color compatibility algorithm to, based on identifying colors within the viewpoint, determine one or more colors for the augmented reality representation of the one or more recommended products.

6. The non-transitory computer readable medium of claim 1, wherein the instructions cause the user client device to determine the viewpoint by:
selecting a time instant during an application session associated with the user client device where the user client device satisfies a stillness threshold; and
capturing a frame of the camera feed at the time instant.

7. The non-transitory computer readable medium of claim 1, wherein the instructions cause the user client device to analyze the viewpoint to identify the real-world object by utilizing a neural network to generate proposed regions of the viewpoint with corresponding probabilities of containing objects.

8. The non-transitory computer readable medium of claim 1, wherein the instructions cause the user client device to generate the one or more recommended products by determining compatibility scores for a plurality of products within a product database, wherein the compatibility scores are based on comparing geometric features of the three-dimensional model with geometric features of the plurality of products.

9. The non-transitory computer readable medium of claim 1, wherein the instructions cause the user client device to identify the three-dimensional model that matches the identified real-world object by implementing a 2D-3D alignment algorithm to determine, for each of a plurality of three-dimensional models with the model database, an alignment relative to the identified real-world object.

10. A system for generating a three-dimensional digital representation of a product based on a similarity to real-world surroundings, the system comprising:
at least one processor; and
a non-transitory computer readable medium comprising:
a model database; and
instructions that, when executed by the at least one processor, cause the system to:
determine, based on a camera feed received from a user client device, a viewpoint that depicts a real-world environment associated with the user client device by selecting a frame of the camera feed at a time instant where the user client device satisfies a stillness threshold;
analyze the viewpoint to identify a real-world object depicted within the viewpoint by utilizing a neural network to determine a proposed region within the viewpoint that has a highest probability of containing the real-world object;
identify, from the model database, a three-dimensional model that matches the identified real-world object;
determine a product class of an augmented reality product overlaid on the real-world environment of the camera feed;
generate, utilizing a style compatibility algorithm to compare part-aware geometric feature vectors of the augmented reality product and the three-dimensional model, one or more recommended products based on style compatibility in relation to the three-dimensional model and further based on the product class associated with the overlaid augmented reality product;
generate an augmented reality representation of the one or more recommended products for display; and
provide the augmented reality representation for display as an overlay together with the real-world object within the real-world environment of the camera feed.

11. The system of claim 10, further comprising instructions that, when executed by the at least one processor, cause the system to compare part-aware geometric feature vectors of the augmented reality product and the three-dimensional model by:
determining an embedding distance between the augmented reality product and the three-dimensional model within an embedding space; and
saving the embedding distance.

12. The system of claim 11, further comprising instructions that, when executed by the at least one processor, cause the system to:
determine a location and an orientation of the overlaid augmented reality product by utilizing one or more correlation filters; and
save the location and the orientation.

13. The system of claim 12, wherein the instructions cause the system to generate the augmented reality representation of the one or more recommended products by:
replacing, in relation to the real-world environment of the camera feed, the overlaid augmented reality product with the augmented reality representation of the one or more recommended products; and
positioning the augmented reality representation of the one or more recommended products to match the location and the orientation of the overlaid augmented reality product.

14. The system of claim 13, wherein the instructions cause the system to generate the augmented reality representation of the one or more recommended products by further utilizing a color compatibility algorithm to, based on identifying colors within the viewpoint, determine one or more colors for the augmented reality representation of the one or more recommended products.

15. The system of claim 10, wherein the instructions cause the system to utilize the style compatibility algorithm to generate the one or more recommended products by determining compatibility scores for a plurality of products within a product database, wherein the compatibility scores are based on comparing geometric features of the three-dimensional model with geometric features of the plurality of products.

16. The system of claim 10, wherein the instructions cause the system to identify the three-dimensional model that matches the identified real-world object by implementing a 2D-3D alignment algorithm to determine, for each of a plurality of three-dimensional models with the model database, an alignment relative to the identified real-world object.

17. A computer-implemented method for generating a three-dimensional digital representation of a product based on a similarity to real-world surroundings of a user, comprising:
 determining, based on a camera feed received from a user client device, a viewpoint that depicts a real-world environment associated with the user client device;
 analyzing the viewpoint to identify a real-world object depicted within the viewpoint;
 identifying, from a model database, a three-dimensional model that matches the identified real-world object;
 determining a product class of an augmented reality product overlaid on the real-world environment of the camera feed;
 generating, utilizing a style compatibility algorithm to compare part-aware geometric feature vectors of the augmented reality product and the three-dimensional model, one or more recommended products based on style compatibility in relation to the three-dimensional model and further based on the product class associated with the overlaid augmented reality product;
 generating an augmented reality representation of the one or more recommended products for display; and
 providing the augmented reality representation for display as an overlay together with the real-world object within the real-world environment of the camera feed.

18. The computer-implemented method of claim 17, wherein determining the viewpoint comprises:
 selecting a time instant during an application session associated with the user client device where the user client device satisfies a stillness threshold; and
 capturing a frame of the camera feed at the time instant.

19. The computer-implemented method of claim 18, further comprising determining that the user client device satisfies the stillness threshold by accessing accelerometer information associated with the user client device.

20. The computer-implemented method of claim 17, wherein determining the viewpoint comprises utilizing a probabilistic model to determine a frame of the camera feed that depicts a style for matching the one or more recommended products.

* * * * *